United States Patent [19]

Kiefer et al.

[11] Patent Number: 5,250,238

[45] Date of Patent: Oct. 5, 1993

[54] PROCESS FOR BLOW MOLDING HOLLOW BODIES WITH SYMMETRIC MOLD PORTION MOVEMENT

[75] Inventors: Erich Kiefer; Peter Klüsener, both of Bonn; Karsten Friedrichs, Bad Honnef, all of Fed. Rep. of Germany

[73] Assignee: Krupp Kautex Maschinenbau GmbH, Bonn, Fed. Rep. of Germany

[21] Appl. No.: 776,522

[22] Filed: Oct. 11, 1991

[30] Foreign Application Priority Data

Oct. 15, 1990 [DE] Fed. Rep. of Germany ....... 4032659

[51] Int. Cl.$^5$ ...................... B29C 49/56; B29C 49/78
[52] U.S. Cl. .................................. 264/40.5; 264/523; 264/540; 425/150; 425/532; 425/541
[58] Field of Search ............. 264/40.1, 40.5, 540, 264/523; 425/150, 532, 541, 451.2

[56] References Cited

U.S. PATENT DOCUMENTS

| 3,325,860 | 6/1967 | Hansen | 425/532 |
| 3,749,541 | 7/1973 | Mehnert | 425/451.3 |
| 3,767,341 | 10/1973 | Siebelhoff et al. | 425/150 |
| 3,883,286 | 5/1975 | Kinslow, Jr. et al. | 425/387 B |
| 4,150,080 | 4/1979 | Hagen | 264/40.5 |
| 4,285,658 | 8/1981 | Bohart et al. | 425/541 |
| 4,409,161 | 10/1983 | Harry et al. | 264/40.5 |

FOREIGN PATENT DOCUMENTS 2338483 2/1975 Fed. Rep. of Germany .
2460771 1/1981 France .

OTHER PUBLICATIONS

Search Report of EP 91 11 6386 (Jan. 20, 1992) 2 pp.

*Primary Examiner*—Catherine Timm
*Attorney, Agent, or Firm*—Panitch, Schwarze, Jacobs & Nadel

[57] ABSTRACT

A process and apparatus for the production of hollow bodies from thermoplastic material by means of blow molding uses a blow molding mold which includes at least first and second mold portions to enclose a generally tubular extruded preform which is expanded within the mold under the effect of an increased internal pressure within the preform. To provide for asymmetric closing and/or opening movements of the mold portions relative to the preform, the blow molding mold is displaced as an entirety parallel to the direction of the opening and/or closing movements of the mold portions, more especially during the mold closing and/or opening procedure, so that an additional motion is superimposed on the movements of the mold portions.

23 Claims, 12 Drawing Sheets

PROCESS FOR BLOW MOLDING HOLLOW BODIES WITH SYMMETRIC MOLD PORTION MOVEMENT

BACKGROUND OF THE INVENTION

In a typical form of process for the production of a hollow body of the thermoplastic material by means of blow molding, a preform or parison is accommodated in a blow molding mold comprising at least first and second mold portions, and expanded therein under the effect of an increased internal pressure within the preform or parison. The mold portions are moved with a reciprocating motion between an open condition in which they are at a spacing from each other and a closed condition in which they bear against each other and with their mutually facing sides define a mold cavity whose contour corresponds to the configuration of the preform when expanded by the increased pressure therein. The movement of the mold portions is produced by at least one drive system for moving them between the open and closed conditions.

In regard to the closing and opening movements of the mold portions, it is generally necessary for those movements to take place in a defined fashion relative to a reference plane of the main frame structure of the blow molding machine, and in such a way that such movements can be satisfactorily reproduced at any time. The usual procedure in that respect is that the mold portions move with a symmetrical motion towards the central plane of a preform which is disposed centrally between them, and then move, again with a symmetrical motion, away from the hollow body which is produced from the preform by expansion thereof. The preform generally hangs freely between the mold portions, before they are moved together.

Accordingly, the central plane of the preform is primarily referred to hereinafter as the above-mentioned reference plane. It should be appreciated however that other planes may constitute the reference plane, if so required.

Particularly when using a hydraulic drive system for producing the closing and opening movements of the mold portions, by virtue of the characteristics of the drive means used in such a system, it is not possible, without taking additional precautionary steps, to achieve the desired synchronism in respect of the mold portions in the closing and opening movements thereof relative to the preform, so that there is the risk that, due to different speeds of movements the mold portions do not reach their respective open or closed condition in the proper definable positions. Such irregularities in the movements of the mold portions are generally undesirable, especially as they can occur in an uncontrollable fashion and can thus differ from one operating cycle of the machine to another.

In order to avoid such irregularities in the movements of the mold portions, as an additional precautionary arrangement in that respect the machine may have synchronisation devices which cause the mold portions to move with a defined motion relative to a reference plane of the main frame structure of the machine. The arrangement is generally such that the synchronisation assembly has at least one mechanical connecting element which is arranged non-displaceably on the main frame structure of the blow molding machine and which kinematically couples the mold portions together. The fixed arrangement of the connecting element on the main frame structure of the machine provides that the closing and opening movements of the mold portions occur in the same fashion but in opposite relationship to each other, relative to the central plane of the preform or the article produced therefrom. That design configuration ensures, while using simple means, that the mold portions open and close symmetrically and thus move into their closed condition or their open condition in properly defined positions.

In one form of such a synchronisation arrangement, the connecting element is a gear which is disposed rotatably on a shaft which is fixedly mounted on the main frame structure of the blow molding machine. The two mold portions have toothed racks which each mesh with the gear. When one of the mold portions moves, the gear is rotated by the corresponding rack, with the result that the other mold portion whose associated rack is disposed parallel to the other rack on the other side of the above-mentioned shaft carrying the gear, is moved in the opposite direction.

In another design configuration of a synchronisation arrangement, a control lever is mounted on the main frame structure pivotably about a stationary shaft. Pivotably connected to the two lever arms of the control lever, which are of the same length, are rods or bars which at their other end are each movably connected to a respective mold portion. The mold portions are kinematically positively connected together and to the main frame structure of the blow molding machine, by arrangements as just described above.

Other forms of synchronisation arrangement may also be used, which are generally familiar to any person skilled in this art and which for that reason do not require more detailed description herein. Such arrangements may comprise for example an endless flexible element such as a chain, cable or the like, which is passed around two wheels, rollers or the like which are mounted rotatably but non-displaceably on the frame structure of the machine. However a common aspect of all the above-indicated constructions is that they have at least one member which is arranged stationarily even if rotatably on the main frame structure of the blow molding machine, and thus establish a reference plane, relative to which the mold portions move symmetrically in opposite relationship to each other. The reference plane in such cases is generally so selected that it coincides with the central plane of the preform, as indicated hereinbefore. The arrangement is frequently also such that disposed in the above-mentioned central plane is the blowing pipe member which co-operates with the blowing mold and the preform and through which inter alia the pressure fluid required for expansion of the preform is passed into the blow molding mold.

A possible design configuration of such a blow molding machine is to be found for example in U.S. Pat. No. 4,150,080, the disclosure of which is hereby incorporated into this application in this respect.

Particularly in the last phase of the closing movement of the mold portions, a symmetrical arrangement of the mold portions in that way is frequently desirable as, in that phase, the two mold portions embrace the preform which is hanging from an extrusion head or other suitable holding means, and squeeze off the waste material present on the preform, while at the same time the portions or regions of the preform which bear against each other are welded together to produce a closed volume for expansion of the preform by the production of an increased internal pressure therein. In the majority of cases, when the preform occupies its receiving position in which it is received by the blow molding mold, the preform will be hanging from the extrusion head of an extrusion apparatus. As however the preform can also be produced in a different fashion from extrusion, it is also possible for the preform to be held in its receiving position by another form of holding means, until it has been received by the blow molding mold.

In the course of extending the range of use of the blow molding process and in particular also for the production of hollow bodies of a highly complicated configuration, it has been found that the above-described movements of the mold portions, which occur symmetrically relative to the preform, are not always advantageous, especially as the blow molding mold is not symmetrically divided in all cases, with the result that the mold portions of the blow molding mold are of mutually different configurations. There are therefore possible uses in which it may be more appropriate or even necessary for the movements of the blow molding mold portions to be such that they occur asymmetrically relative to the preform. That may also apply in regard to the opening movements of the mold portions, relative to the manufactured article which after expansion of the preform is generally held by the blowing pipe member or another member which co-operates with the blow molding mold and which does not participate in the opening movement of the mold portions.

SUMMARY OF THE INVENTION

An object of the present invention is to provide a process for the production of a hollow body of thermoplastic material, such that if necessary the closing and also the opening movements of blow molding mold portions can take place asymmetrically relative to a preform, in a simple fashion which can be reproduced at any time.

Another object of the present invention is to provide a process for the production of hollow bodies of thermoplastic material by blow molding, which involves the use of simple and inexpensive means for producing asymmetrical closing and opening movements of the mold portions relative to the preform, while maintaining the degree of accuracy that is required for the production of hollow bodies in that way.

Still another object of the present invention is to provide an apparatus for the production of a hollow body of thermoplastic material by blow molding, which can provide for asymmetrical opening and closing movements of the blow molding mold portions relative to the preform to be produced therein, while retaining the necessary accuracy of movement required for satisfactory production of the hollow body.

The foregoing and other objects are achieved by the invention as set forth herein.

As will become more clearly apparent from the description hereinafter of preferred embodiments of this invention, the process procedure and the apparatus configuration according to the invention provide that superimposed on the respective closing or opening movements of the mold portions of the blow molding mold is an additional movement, with the result that the blow molding mold portions move at different speeds and thus asymmetrically relative to a reference plane of the main frame structure of the blow molding machine, that is to say generally towards the preform and then away from the expanded hollow body respectively, in the closing and opening movement. The displacement which the blow molding mold experiences in its entirety can be produced in different ways in accordance with the principles of the invention and also depends on the drive system for producing the closing and opening movements of the mold portions.

The drive systems for producing the movements of the blow molding mold portions may differ from each other inter alia by virtue of the nature of the drive means or by virtue of the structure of the closing unit which carries the mold portions. Thus, there may be a common drive means for the mold portions, while it is also possible for each mold portion to have its own drive means operatively associated therewith. Hydraulic piston-cylinder units are primarily used as the drive means, because of the high forces to be applied.

For that reason therefore, reference is primarily made hereinafter to hydraulic piston-cylinder units, although obviously without that being intended to constitute a limitation on the invention. It will also be appreciated that such units may also have a plurality of hydraulic cylinders acting in parallel.

The drive system may be what is known as a triple-plate closure support assembly comprising a first carrier plate which carries one blow molding mold portion, a second carrier plate which carries the other mold portion, and a drive plate which extends parallel to the first and second carrier plates and which is disposed on the side of the first carrier plate remote from the second carrier plate, with the drive plate being connected to the second carrier plate by rod members or the like struts. Such a configuration can be seen in FIG. 1 of the accompanying drawings in which reference numeral 12b indicates the first carrier plate, reference numeral 12a indicates the second carrier plate and reference numeral 16 indicates the drive plate. Such an arrangement has only one drive means for producing the closing and opening movements of the mold portions, and that common drive means is arranged between the first carrier plate and the drive plate. Actuation of the drive arrangement for example in the closing direction provides that, if a synchronisation element of the kind described above (for example a gear, connecting element or the like) arranged fixedly on the main frame structure of the blow molding machine kinematically couples together the mold portions or the carrier plates thereof, the mold portions move symmetrically towards the preform while the drive plate moves away from the preform to the extent of the movement of the second carrier plate.

In accordance with the invention, displacement of the blow molding mold may be effected by virtue of a system wherein a member of the synchronisation arrangement on the main frame structure, which member acts as a kinematic connecting element, experiences a displacement, that is to say a change in its position, by virtue for example of an additional, independent drive system. The result of such displacement of the above-indicated connecting element is that the entire movable unit consisting inter alia of the first and second carrier plates, the drive plate and the common drive means for the closing and opening movements also experiences a corresponding displacement.

Another option is that at least one of the connecting means of the synchronisation arrangement experiences a change in its effective length, which can be achieved by virtue of an additional, independent drive system.

That also has the effect that the blow molding mold is displaced in its entirety.

It will be seen therefore that superimposed on the closing and/or opening movements of the mold in both cases is an additional movement with the result that the movements of the mold portions which result from the respective opening or closing movements of the mold portions relative to each other and the displacement of the blow molding mold in its entirety take place asymmetrically relative to the preform. The closing and/or opening movement of the mold portions relative to each other, and the drive means used therefor, are not affected by that displacement of the blow molding mold as a unit. Those two movements which occur independently of each other, namely on the one hand the closing and/or opening movement of the mold portions and on the other hand the displacement of the blow molding mold as a unit, provide that it is possible to produce virtually any travel-time characteristic or speed characteristic in respect of the movements of the blow molding mold portions relative to the preform. Separation of those two movements and the fact that the drive systems used for producing the two movements are independent of each other provide on the other hand that the force for closing the blow molding mold and for squeezing off the waste material from the preform, and the force required to hold the blow molding mold in the closed condition when the preform is expanded under the effect of an increased pressure therein, remain unaffected by the displacement of the blow molding mold.

In accordance with a preferred feature of the invention, the desired travel-time characteristic and/or the speed characteristic of each mold portion can be predetermined separately, in regard to its opening and/or closing movements, and the movements required for that purpose, on the part of the drive system which closes and opens the mold, and the additional drive system for displacement of the mold as an entirety, can be determined in dependence on the above-mentioned travel-time characteristics and/or speed-time characteristics. In that respect, it may be desirable to provide for each mold portion a program in respect of the travel-time characteristic and/or speed characteristic, in which respect it may also be advantageous to provide a separate program for the closing movement and the opening movement of the mold portions respectively.

On the basis of the desired travel-time characteristics and/or the speed characteristics of the mold portions relative to the preform, it is possible in a simple fashion to ascertain the required closing and opening travel-time characteristic which is governed exclusively by the drive system for producing the closing and opening movements of the mold portions, by the distance-time characteristic of the mold portions relative to each other being calculated. The distance-time characteristic is the preset value or reference or desired value for the drive system for producing the closing and opening movements of the mold portions.

In accordance with the invention, the displacement of the blow molding mold in its entirety, as is required to produce the desired asymmetric movement of the mold portions relative to the central plane of the preform, can be determined by ascertaining the distance of the central plane between the blow molding mold portions from the central plane of the preform or another reference plane of the main frame structure of the apparatus. In that connection, the central plane between the mold portions corresponds to a plane which extends centrally between the mold portions and is thus equally spaced therefrom and relative to which the movements of the mold portions take place in the same but opposite relationship, that is to say symmetrically relative to each other. The resulting distance-time characteristic in respect of the two central planes (the central plane between the mold portions and the central plane of the preform) corresponds to the required displacement of the blow molding mold and constitutes the presetting value or desired or reference value for the additional drive system which produces the displacement of the mold. In that respect, besides ascertaining the extent of such displacement, it is also necessary to ascertain the direction thereof as displacement of the mold may occur in both directions.

Thus, with a separate presetting value or reference or desired value in respect of the travel-time characteristic or the speed characteristic of the individual mold portions, the asymmetric movements of the mold portions may be produced by superimposition of the closing or opening movements of the mold portions and the displacement of the mold, in relation to each other.

It is also possible for the drive means of the drive system which produces the displacement of the mold as a unit to be arranged to act at a different location from the connecting element of the synchronisation arrangement. It may be appropriate for example for the drive means to be disposed between a blow molding mold portion and the main frame structure of the blow molding machine. In that case the additional drive system must produce a travel-time characteristic which corresponds to the respective travel-time characteristic of the mold portion which is connected to the additional drive system. In that connection, there is no need to provide a connecting element for kinematically coupling the mold portions together as the travel-time characteristic, which is predetermined relative to the reference plane, of that mold portion which is not connected to the additional drive system results on the one hand from the differential movement as between the closing and/or opening movement of the mold portions relative to each other, and on the other hand the movement, produced by the additional drive system, of the mold portion which is connected thereto. If the assembly includes a connecting element, it must be possible for that connecting element to be freely adjustable in respect of its position or length, for the purposes of adaptation to the desired asymmetrical movements of the mold portions relative to the preform.

In an embodiment of a blow molding machine having a drive system in which there is a separate drive means for each blow molding mold portion, a respective piston-cylinder unit is disposed between the main frame structure and the carrier plates which carry the respective mold portions. Due to joint actuation of the hydraulic cylinders with hydraulic operating fluid, the mold portions move towards or away from the preform; such an assembly generally also has a synchronisation arrangement of the kind indicated above (gear, connecting element or the like) in order to produce symmetrical movements of the mold portions relative to the preform. In a blow molding machine of that kind, in order to achieve the desired asymmetric movements of the mold portions, it is additionally possible for the blow molding mold to be displaced in its entirety, by for example the above-mentioned connecting element being subjected to displacement. In such a machine, displacement of the blow molding mold corresponds to displacement of or a change in length of the synchronisation arrangement, with a travel-time characteristic corresponding to the spacing of the central plane of the mold portions relative to the central plane of the preform.

Due to the displacement of or the variation in length of the connecting element, the carrier plates carrying the mold portions, and the parts secured thereto of the hydraulic piston-cylinder units, are also displaced. That is possible as the chambers of the cylinders for producing the opening and closing movements are communicated with each other by way of the hydraulic fluid line system. It is therefore possible for the two carrier plates which carry the mold portions to be displaced in one direction by the effect of a comparatively low force, by the action of an adjusting or control drive which may for example also be in the form of a hydraulic piston-cylinder unit. In a blow molding machine configuration of that kind, the drive system which produces the closing and opening movements of the mold portions is no longer fully uninvolved in displacement of the blow molding mold, as the asymmetric movements of the mold portions, which are produced by that drive system, relative to the reference plane, result in variations in the distances to be covered by the mold portions, and the drive means connected to the respective mold portions. Therefore, displacement of the blow molding mold as an entirety will have a direct effect on the respective stroke movement to be produced by the hydraulic piston-cylinder units of the individual mold portions. It will be appreciated that the piston-cylinder units have a maximum stroke movement which permits displacement of that kind.

In a machine having a drive means for each mold portion, it is desirable for the design configuration to be such that a separate travel-time characteristic and/or speed characteristic in respect of the opening and/or closing movements is preset for each mold portion. The resulting distance-time characteristic and/or speed characteristic of the mold portions relative to each other represents the presetting value (desired or reference value) for the drive system, for example the total amount of hydraulic operating fluid which is to be fed to or drained from the drive means per unit of time. The result of displacement of the blow molding mold is that, during such displacement, one mold portion and thus the drive means operatively associated therewith is moved more quickly and the other mold portion and the respectively associated drive means is moved more slowly, to the same extent, with the relative movement of the mold portions with respect to each other remaining unchanged. That procedure will therefore provide for adjustment of the distribution of the total amount of hydraulic fluid by volume fed to the individual drive means, and will provide for movements of the mold portions corresponding to the desired asymmetric movement of the mold portions relative to a reference plane. As soon as the mold no longer experiences any displacement, the hydraulic operating fluid is again uniformly distributed to the individual drive means.

With a blow molding machine of that kind, having a drive means for each mold portion, it is also possible for the additional drive system to be arranged to act directly on a mold portion or a carrier plate carrying a mold portion. In that arrangement the additional drive system performs the predetermined movements of the mold portion connected thereto, so that its movements are established with respect to the main frame structure of the blow molding machine. Therefore, the amount of hydraulic operating fluid fed to the drive means associated with that mold portion is such that the mold portion can perform the movement imparted thereto by the additional drive system, relative to the main frame structure. The movement of the other mold portion which is not connected to the additional drive means then derives from the stroke movement of the drive means connected thereto, on the basis of the differential amount fed thereto as between the total feed amount of hydraulic operating fluid and the amount of hydraulic fluid which is fed to the drive means of the mold portion which is connected to the additional drive. With that arrangement there is no need to provide a synchronisation arrangement. If however such an arrangement is present, it must be rendered inoperative, for example it must be designed to be freely displaceable or freely adjustable in respect of its length.

In accordance with the description hereinbefore, displacement of the blow molding mold by means of an additional drive system in a blow molding machine having a drive means for each blow molding portion means that, due to the additional drive system, the total feed amount of hydraulic operating fluid is subjected to positive distribution to the individual drive means, while the movements of the mold portions relative to each other remain unaffected.

However, in blow molding machines which have a separate hydraulic piston-cylinder unit as a drive means for each blow molding mold portion, in accordance with a further proposal of the invention it is possible for the displacement of the blow molding mold, as is required to produce the asymmetric movement of the mold portions, to be produced by the hydraulic operating fluid which is generally to be supplied to the drive means to be suitably divided up and distributed by appropriate means so as to give the desired asymmetric movements of the mold portions relative to the reference plane; in this arrangement also, the movements of the mold portions relative to each other remain unaffected by distribution of the operating fluid. That proposal of the invention therefore provides that the total feed amount of hydraulic operating fluid which is determined by the detected movements of the mold portions relative to each other is to be distributed to the individual drive means, in dependence on the extent of the required displacement of the blow molding mold as an entirety, so as to give the necessary mold displacement without requiring an additional drive system. An important consideration in that respect is that the step of dividing up the volume flows of operating fluid occurs only after ascertaining the volume flows of hydraulic operating fluid, that is required overall to produce the closing and/or opening movements of the mold portions, so that in that way the closing and/or opening movements of the mold portions relative to each other remain unaffected by the displacement of the blow molding mold as a whole.

Desirably, the procedure in that respect is such that arranged at the connecting element of the synchronisation arrangement which is adjustable in respect of position or length is a measuring device or pick-up for detecting the distance covered or for detecting the speed, to measure a value in respect of the actual displacement of the blow molding mold. As described hereinbefore, the displacement of or variation in length of the connecting element corresponds to the displacement of the blow molding mold relative to the main frame structure of the machine. That actual displacement is compared to the reference or desired displacement which is ascertained from the travel-time characteristic of the distance of the central plane between the mold portions from the central plane of the preform and which corresponds to a given mode of distribution of the hydraulic operating fluid, distribution of the amount of operating fluid supplied being corrected in dependence on any deviation which occurs.

It may also be desirable for a measuring device or pick-up for detecting the travel covered or the speed of movement to be arranged at a blow molding mold portion, for detecting the actual movement of the latter. Distribution of the operating fluid is then corrected in dependence on a deviation of the measured value from the predetermined travel-time characteristic and/or speed characteristic of that mold portion. In that case a synchronisation arrangement which can be set free is not absolutely necessary for ascertaining the actual value.

In theoretical terms, the asymmetric movements of the mold portions in such blow molding machines are also made up from the superimposition of the closing or opening movements, and the displacement of the blow molding mold. The closing or opening movement of the mold portions relative to each other is produced by the total feed amount of hydraulic operating fluid, irrespective of how that supply of fluid is distributed to the individual drives. In that connection, an unequal distribution corresponds to an increase in the distance covered by one mold portion and a reduction by the same amount in the distance covered by the other mold portion. However, it will be appreciated that dividing up the distances covered by the mold portions in that way, and effectively redistributing the travel movements of the mold portions, corresponds to a displacement of the mold portions in conjunction with each other and thus displacement of the mold in one direction.

The embodiments of the invention as described herein have in common the aspect that the predetermined asymmetric movements of the mold portions relative to a relative plane of the main frame structure are composed of the closing or opening movement of the mold portions relative to each other, on the one hand, and a superimposed displacement of the mold in its entirety, on the other hand. Depending on the respective design configuration adopted, the apparatus may use an additional drive system which engages a mold portion or a connecting element of the synchronisation arrangement and which produces the corresponding movement for the predetermined additional displacement of the mold.

In the constructions in which the additional drive means is arranged on a mold portion or another element of the blow molding apparatus, which follows the movement of that mold portion, use of a synchronisation arrangement is not imperatively required. In accordance with a further preferred feature of the invention, it is however particularly desirable at any event to provide a synchronisation arrangement with a connecting element which is adjustable in respect of its position or its length and which can be secured to the main frame structure. It is then possible in a simple fashion, by fixing of the connecting element, to provide that if necessary it is again possible to produce a symmetrical movement of the mold portions for example with respect to the preform. That can be important in particular in the last phase of the mold-closing operation when the mold portions come to bear against each other and generally embrace a blowing mandrel or tube member through which the pressure fluid is introduced for the purposes of expanding the preform. In that arrangement the blowing tube member must not be subjected to any unacceptable one-sided loading and deformation. It should occupy a position which is oriented centrally with respect to the corresponding opening of the blow molding mold. The connecting element can be fixed in a simple manner using mechanical means, for example by means of a pin or other element which, in the fixed position of the connecting member or a member connected to the latter, engages into an opening provided for that purpose in said connecting member or the member connected thereto.

For those reasons it may be desirable for the program for the travel-time characteristic of the mold portions during the closing movement to be such that it comprises first and second sections of which the second associated with the end of the closing phase gives rise to movements which satisfy the requirements for squeezing off waste material from the preform and welding the preform and, if necessary, take place symmetrically with respect to a component of the mold which is not participating in the opening and closing movements. In that connection, it should be possible to execute that last section of the program substantially independently of the preceding asymmetric movements of the mold portions. It may therefore be desirable to provide a further program section which serves as a bridging section and which occurs between the program section associated with the end of the closing phase and the section prior thereto, that further bridging program section serving for calculation of the movements of the mold portions which are required to displace the mold portions from their end positions of the first program section to their starting positions for the last program section.

In addition, the synchronisation arrangement which is adapted to be adjusted in respect of its position or its length and which can possibly also be arrested in a set condition provides that the movements of the mold portions can take place symmetrically relative to different reference planes, without the need for complicated adjustments of the blow molding mold for example relative to the extrusion head.

Where the preform is possibly closed at its free end, it may also be desirable to pass supporting air into the preform, in order to prevent the internal surfaces of the tubular preform from coming to bear against each other. However it may also be desirable for the preform to be subjected to a certain expansion effect, prior to the preform being received by the blow molding mold. Preliminary expansion of the preform in that way is important when the mold portions are moved asymmetrically relative to the preform, as it is not impossible for a mold portion to touch the hanging preform and pivot it in such a way that the preferably tubular preform would be compressed, if there were no supporting air therein or if the preform had not been subjected to a preliminary expansion effect. It will be noted however that introducing supporting air and/or subjecting the preform to preliminary expansion in that way represent steps which are known in this art and which therefore do not need to be described in greater detail herein.

As, in accordance with the invention, the blow molding mold is displaceable in its entirety relative to the support structure of the blow molding machine, it may be necessary for items of equipment which are disposed in a predetermined position relative to the blow molding mold, for example the device for supplying the blowing air or the above-mentioned supporting air, also to be arranged displaceably. That can be done for example by such items of equipment being fixedly connected to one of the mold portions or being displaced together with the above-mentioned connecting element.

It will be noted at this point that the terms control and regulate may be used in the following description and claims interchangeably with each other, and one does not exclude the other.

Further objects, features and advantages of the present invention will be apparent from the following description of preferred embodiments.

DESCRIPTION OF PREFERRED EMBODIMENTS

Figure 1:
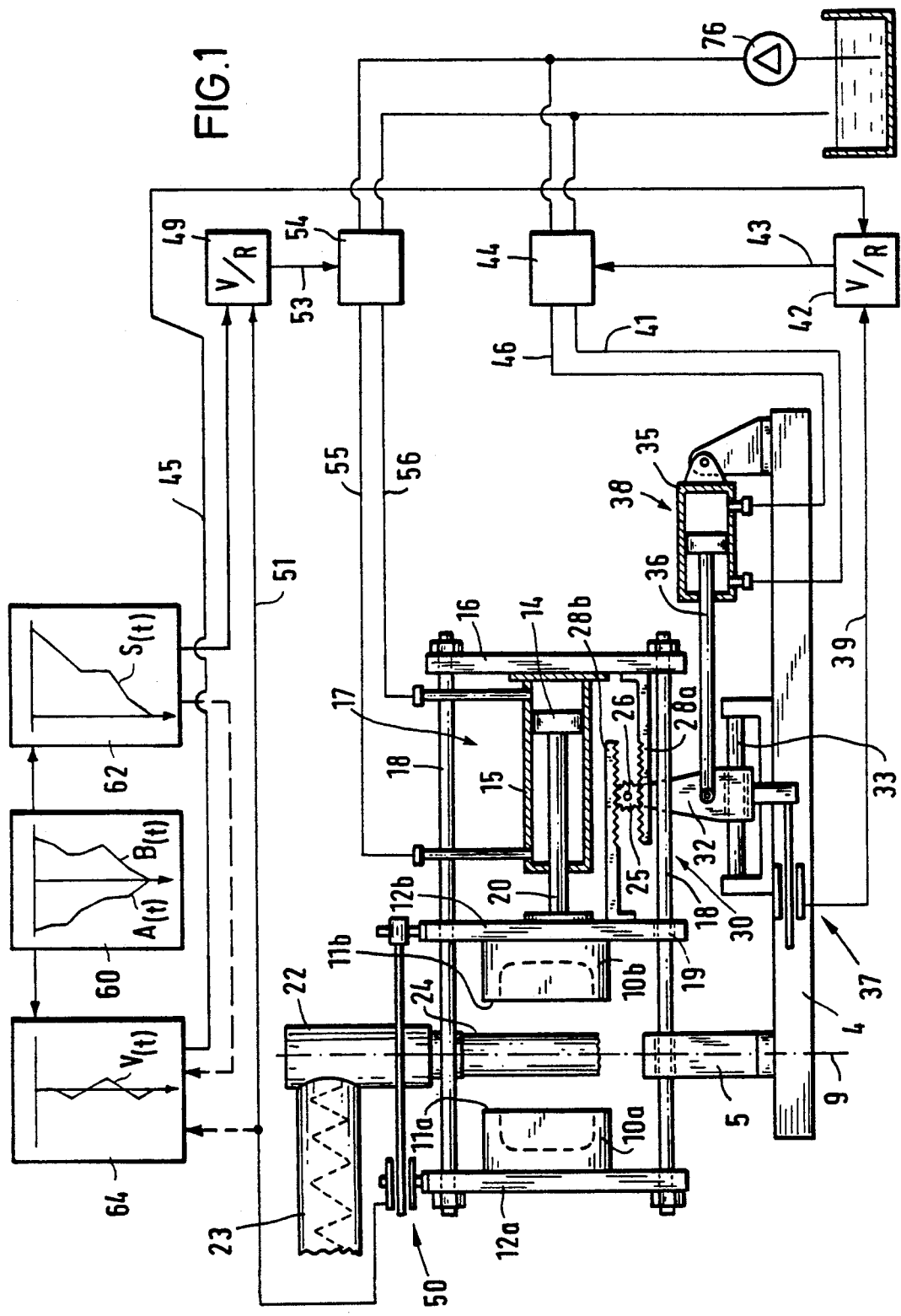
FIG. 1 is a diagrammatic view of a blow molding machine having a common drive means for the closing and opening movements of the blow molding mold portions.
Figure 4:
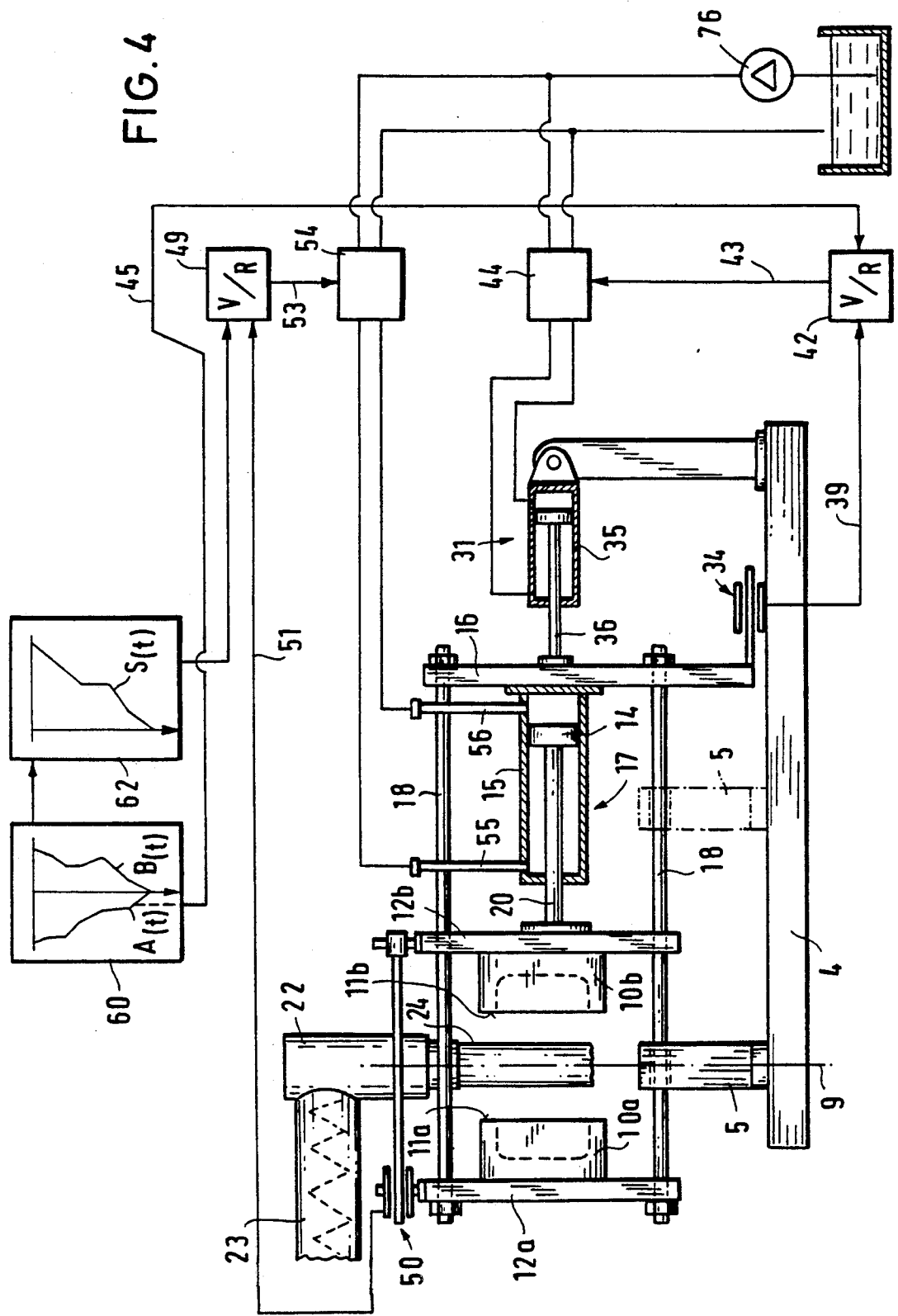
FIG. 4 is a diagrammatic view of another embodiment of a blow molding machine with common drive for the closing and opening movements of the mold portions.

Referring firstly to FIGS. 1 and 4, the embodiments of apparatus for the production of hollow bodies from thermoplastic material by blow molding have a common drive means for the closing and opening movements of the portions of the blow molding mold. The common hydraulic drive means as indicated generally at 17 in FIGS. 1 and 4 comprises a piston 14 which is slidable in a cylinder 15 and the piston rod 20 of which is connected to a carrier plate 12b which in turn carries the one blow molding mold portion 10b. The cylinder 15 is disposed on a drive plate 16 which is rigidly connected to another carrier plate 12a by means of rods or bars 18 which extend through openings and guides 19 in the carrier plate 12b. The carrier plate 12a is arranged on the other side of the carrier plate 12b and carries the other blow molding mold portion 10a. The members 18 and therewith also the carrier plate 12a and the drive plate 16 are mounted displaceably on the main frame structure 4 of the machine by way of support stands 5 which have suitable guides. Further details of the blow molding machine, which are not relevant for the purposes of the present invention, are not illustrated for the sake of enhanced clarity of the drawing.

In order to influence the movements of the mold portions 10a, 10b relative to the generally tubular preform 24, the blow molding apparatus has a synchronisation arrangement which is indicated generally at 30 in FIG. 1 and which comprises a gear 25 which is mounted rotatably on a diagrammatically indicated shaft 26 and which meshes with two tooth racks 28a and 28b which are each mounted to the drive plate 16 and to the carrier plate 12b respectively. It will be appreciated that it is also possible for the synchronisation arrangement to be disposed directly between the carrier plates 12a and 12b so that the gear meshes with racks which are each connected to a respective carrier plate. The same effect is produced with both arrangements. The shaft 26 is mounted in a holder which is diagrammatically indicated at 32 and which, by way of bar members 33, is displaceable relative to the main frame structure of the machine, parallel to the opening and closing movements of the mold portions 10a, 10b. Such displacement is produced by an additional drive means 38 which is in the form of a hydraulic stroke piston-cylinder unit, the piston rod 36 of which is connected to the holder 32 while the cylinder 35 thereof is connected to the main frame structure 4.

Disposed above the mold portions 10a, 10b is the extrusion head 22 of an extrusion apparatus 23 from which the generally tubular preform 24 is extruded into the space between the two mold portions 10a, 10b of the mold which is then open. Depending on the respective extrusion head used, the preforms can be extruded continuously or discontinuously from the extrusion head. That involves known procedures which do not need to be further described herein.

As soon as a preform 24 is of the length required for the production of a hollow body, it is received by the blow molding mold by the mold portions 10a, 10b being moved by the drive means 17 from their open condition shown in FIG. 1 into their closed condition, so that the mutually facing boundary surfaces 11a, 11b bear against each other and define a mold cavity, within which the preform is expanded. With respect to the view shown in FIG. 1, actuation of the drive means 17 in the closing direction provides that, with the holder 32 of the synchronisation arrangement 30 being stationary, the carrier plate 12b is moved towards the left and the drive plate 16 with the carrier plate 12a is moved to the same extent towards the right, with the mold portions moving symmetrically relative to a reference plane of the main frame structure 4, which generally corresponds to the central plane 9 of the preform 24. Hereinafter therefore the central plane of the preform, as indicated at 9, is primarily taken as being the reference plane, although without that being intended to constitute a limitation.

When the gear 25 of the synchronisation arrangement occupies its position shown in FIG. 1, which is referred to hereinafter as 'neutral position', the plane which extends normal to the plane of the drawing in FIG. 1 and which divides in half the respective distance between the two mold portions 10a, 10b coincides with the central plane 9 of the preform. As long as the gear 25 is in its neutral position, the opening and closing movements of the mold portions 10a, 10b are thus symmetrical relative to the central plane 9. The position of the gear 25 of the synchronisation arrangement 30 therefore determines the position of the plane which divides in half the distance between the two mold portions 10a and 10b and which therefore always, that is to say irrespective of the absolute position of that plane, extends centrally between the two mold portions 10a, 10b or, when they are of an asymmetric configuration, centrally between the two carrier plates 12a, 12b.

In accordance with the invention, to produce a movement of the mold portions 10a, 10b which is asymmetrical relative to the central plane 9 defined by the preform 24, it is possible for the blow molding mold to be displaced by the additional drive means 38, by way of the gear 25 which represents a kinematic connection between the mold portions 10a, 10b. In that way, superimposed on the opening or closing movement of the mold portions 10a, 10b is a movement which is parallel to the opening or closing movement, with the result that the blow molding mold portions move asymmetrically with respect to the central plane 9 of the preform. With respect to the view shown in FIG. 1, displacement of the holder 32 with the gear 25 out of the neutral position thereof towards the left produces a faster resultant movement of the mold portion 10b and a correspondingly slower resultant movement of the mold portion 10a. Displacement of the gear 25 towards the right from its neutral position results in the contrary effects.

In that connection, that displacement of the blow molding mold is completely independent of the mold portion opening and closing movements which are produced by the common drive means 17, so that such displacement can be produced for example even when the mold portions are not performing any movement relative to each other or are in their closed or open condition.

For the purposes of regulating the operating movements of the blow molding machine and in particular the movements of the blow molding portions, the apparatus has a travel-time programmer 60 into which the desired travel-time characteristics and/or speed characteristics in respect of the mold portions 10a, 10b, for example relative to the central plane 9 of the preform, are inputted. In other words, the distance which is covered by a respective one of the mold portions, in relation to the time and/or the speed at which the distance is travelled, is inputted into the programmer 60. The programmer 60 is connected to a calculating unit 62 which, on the basis of the values which are inputted in the programmer 60, and the resulting desired or reference movements of the mold portions 10a, 10b, calculates the desired or reference spacing of the mold portions 10a, 10b from each other and/or the desired or reference speed thereof relative to each other, and presets same in a comparison and regulating device 49, as a reference value. By way of the signal line 53, the device 49 controls a valve 54 which is communicated by way of lines 53, 56 with the cylinder 15 of the common drive system 17 and which sets the volume flow of the hydraulic operating fluid, which is conveyed by a pump 76 to the cylinder 15 or returned therefrom and which corresponds to the closing and/or opening movement of the mold portions. The actual spacing of the mold portions 10a, 10b is detected by way of a measuring pick-up 50 which co-operates with the mold portions 10a, 10b and is passed by way of the signal line 51 to the comparison and regulating device 49 which, when the actual value deviates from the desired or reference value, suitably corrects the position of the valve 54.

In general terms, direct detection of the spacing of the mold portions from each other or the spacing of the carrier plates associated therewith from each other is more advantageous than separately detecting the travel movements of the mold portions or the associated carrier plates relative to the main frame structure, and calculating the spacing between the mold portions from the detected travel movements. In the latter case, resilient deformation phenomena of the machine components which carry the closing forces can result in inaccurate results.

In addition the programmer 60 is connected to a calculating unit 64 for calculating the desired or reference distance of the central plane of the mold portions 10a, 10b relative to the central plane 9 of the preform 24. Relative to the first-mentioned central plane which extends at the halfway position between the mold portions 10a, 10b, that is to say centrally therebetween, the movements of the mold portions take place symmetrically and therefore in opposite relationship. The distance-time characteristic of the two central planes relative to each other corresponds to the reference value in respect of the mold displacement to be superimposed on the movements of the mold portions, and is preset by the calculating unit 64, by way of a line 45, in a comparison and regulating unit 42 which, by way of the signal line 43, controls a valve 44 which, by way of the lines 46, 41, feeds the drive means 38 with the volume flow of hydraulic operating fluid required to produce such displacement of the mold. The actual position (actual value) of the gear 25 is detected by a travel pick-up 37 co-operating with the holder 32. The travel pick-up 37 is connected by way of the signal line 39 to the comparison and regulating unit 42 which corrects the position of the valve 44 in dependence on a deviation of the actual value from the reference value which is preset by the calculating unit 64. The shaft 26 of the gear 25 is always at the same distance relative to the central plane of the mold portions 10a, 10b so that the detected spacing between the central plane of the mold portions and the central plane 9 of the preform 24 corresponds to the required displacement of the blow molding mold and thus the gear 25 relative to the main frame structure.

It may be desirable for the calculating units 62 and 64 to be coupled together and/or for the program for displacement of the blow molding mold to be performed in dependence on the actual spacing of the mold portions from each other, in order to guarantee synchronous program execution in respect of the closing and/or opening movements of the mold portions on the one hand and the displacement of the blow molding mold on the other hand. That possible configuration is shown for example in FIG. 1 by broken-line signal lines between the respective items of equipment.

Figure 2:
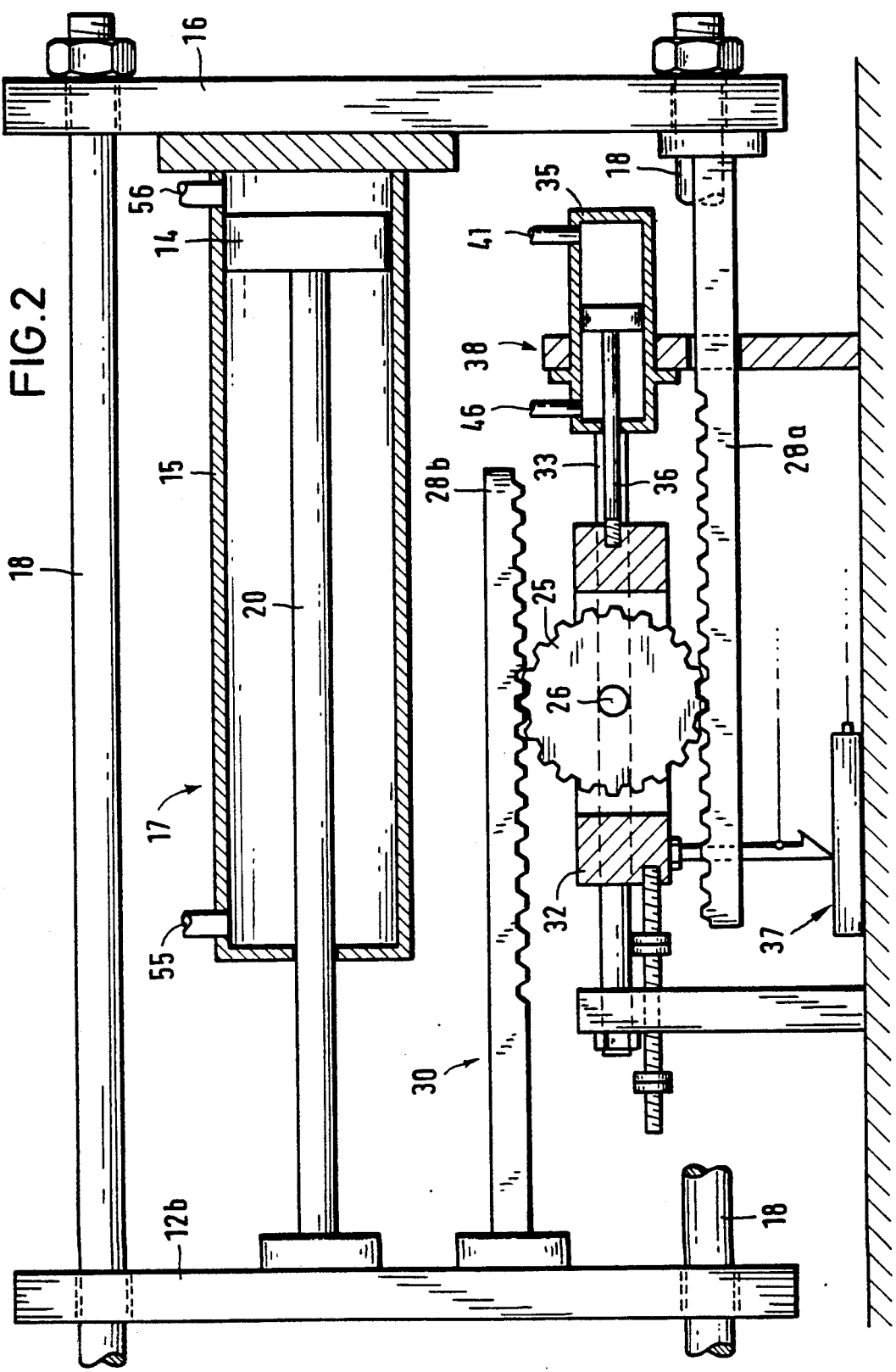
FIG. 2 is a diagrammatic view of a possible embodiment of a displaceable drivable connecting element.

Reference is now made to FIG. 2 showing a form of the displaceable synchronisation arrangement which is slightly modified in comparison with that shown in FIG. 1, on a larger scale than in FIG. 1. It will be readily apparent that the construction shown in FIG. 2 is very similar to that shown in FIG. 1 and it will therefore not be described in full detail again at this point.

Figure 3:
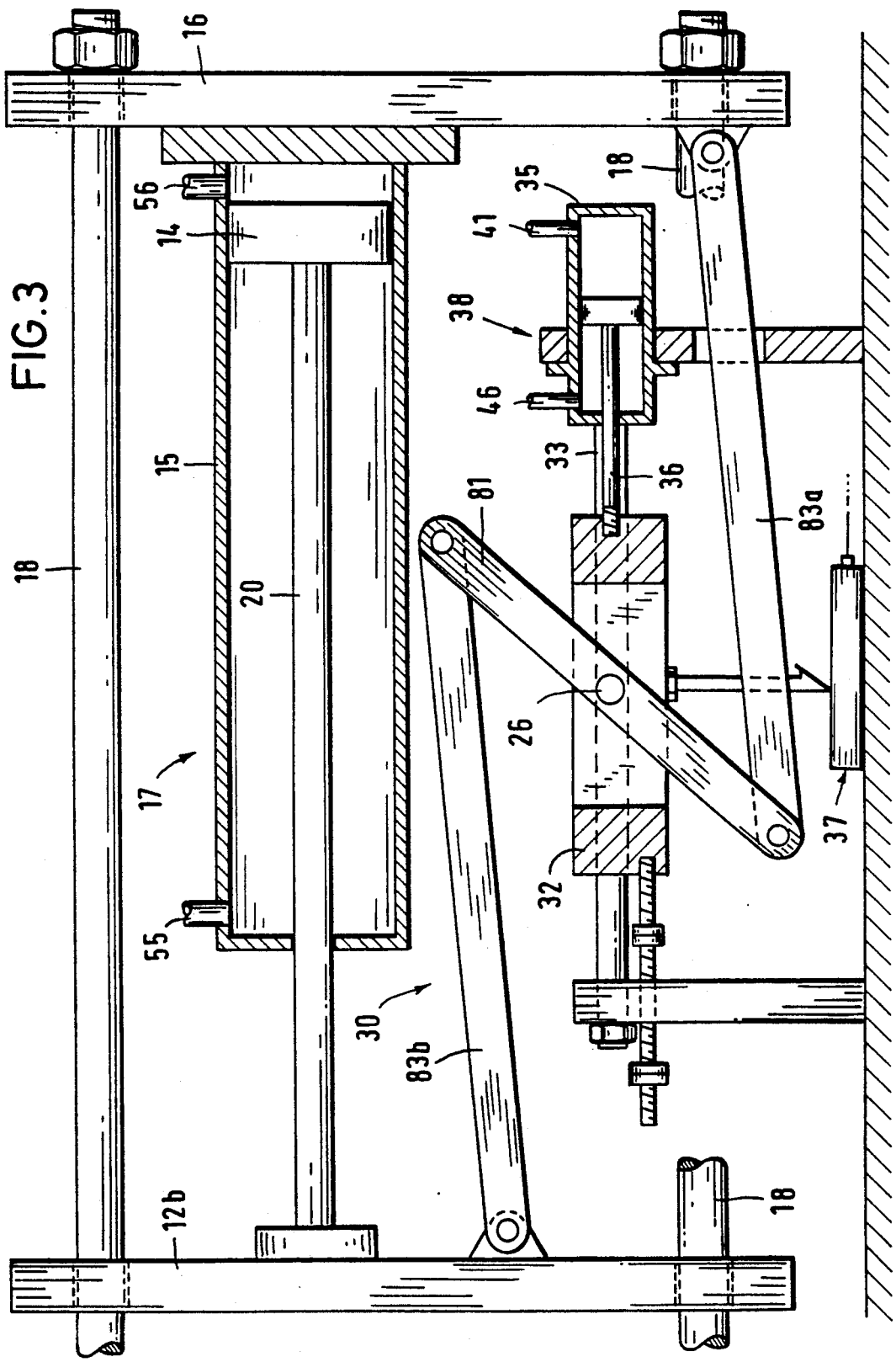
FIG. 3 is a diagrammatic view of another embodiment of a displaceable drivable connecting element.

Referring now to FIG. 3, shown therein is still another embodiment of a displaceable synchronisation arrangement 30. Instead of a gear meshing with racks, the FIG. 3 construction has a control lever 81 disposed pivotably on the shaft 26 of the displaceable holder 32. Connecting rods 83a and 83b are pivotally connected to the mutually opposite ends of the control lever 81, at respectively equal distances from the pivot shaft 26. The rods 83a and 83b are in turn connected to the drive plate 16 and the carrier plate 12b respectively. That arrangement also provides that, as when using a gear meshing with tooth racks, the carrier plate 12b and the drive plate 16 move symmetrically relative to the shaft 26.

The embodiment shown in FIG. 4 differs from that shown in FIG. 1 more especially in that an additional drive means 31 is disposed between the main frame structure 4 and the drive plate 16 so that the piston rod 36 of the cylinder 35 which is mounted to the main frame structure directly engages the drive plate 16. The result of that arrangement is that the movements of the piston which is guided in the cylinder 35 are transmitted directly to the unit comprising the drive plate 16 and the carrier plate 12a. The movements of that unit 16, 12a therefore take place synchronously with those of the piston which is guided in the cylinder 35. That latter point also applies in regard to the carrier plate 12b and thus the mold portion 10b carried thereby, as long as the piston 14 and the cylinder 15 of the common drive means 17 for the opening and closing movements do not perform any movement relative to each other. In contrast, when the common drive means 17 is actuated, the carrier plate 12b with the mold portion 10b performs a resultant movement which is composed of the motion components of the additional drive means 31 and the common drive means 17. The arrangement of the common drive means 17 for producing opening and closing movements of the mold portions and the regulation thereof correspond to the construction shown in FIG. 1. As now the additional drive means 31 acts on the drive plate 16 and thus directly produces the movements thereof and the movements of the carrier plate 12a, the travel-time characteristic of the mold portion 10a with the drive means 31 is preset by way of the signal line 45 for the comparison and regulating unit 42 by the programmer 60 in which the travel-time characteristics of the individual mold portions are stored.

It will be appreciated that it is also possible for the additional drive means 31 to be arranged to directly engage one of the carrier plates 12a or 12b. In that arrangement the programmer 60 would preset for the regulating unit 42 the travel-time characteristic of the mold portion 10a or 10b which is connected to the additional drive means 31.

By way of the signal line 43, the comparison and regulating unit 42 controls the valve 44 which determines the volume flow of hydraulic operating fluid, which is required for displacement of the drive plate 16. By virtue of the rigid connection to the carrier plate 12a by means of the members 18, displacement of the drive plate 16 causes a corresponding movement of the mold portion 10a. The actual position of the drive plate 16 is detected by a travel pick-up 34 and inputted as an actual value to the regulating unit 42 by way of the signal line 39. The comparison and regulating unit 42 corrects the position of the valve 44, as required, in dependence on a deviation between the actual value inputted to the regulator 42, and the reference value in respect of the movement of the mold portion 10a, which is predetermined by the programmer 60.

As can be seen from FIG. 4, in a construction in which the additional drive means 31 directly engages a component on which one of the mold portions is mounted, there is no synchronisation arrangement as the respective position of the unit comprising the holding plate 12a and the drive plate 16 is established by the additional drive 31. The position of the cylinder 15 of the common drive 17 is also established in that way. Accordingly the movement of the piston 14 relative to the main frame structure, and therewith also that of the mold portion 10b, are also defined. Therefore, in such a construction the calculating unit 64 shown in FIG. 1 can be omitted especially as, with that construction, there is no possibility of establishing the actual position of the central plane between the two mold portions 10a and 10b.

Figure 5:
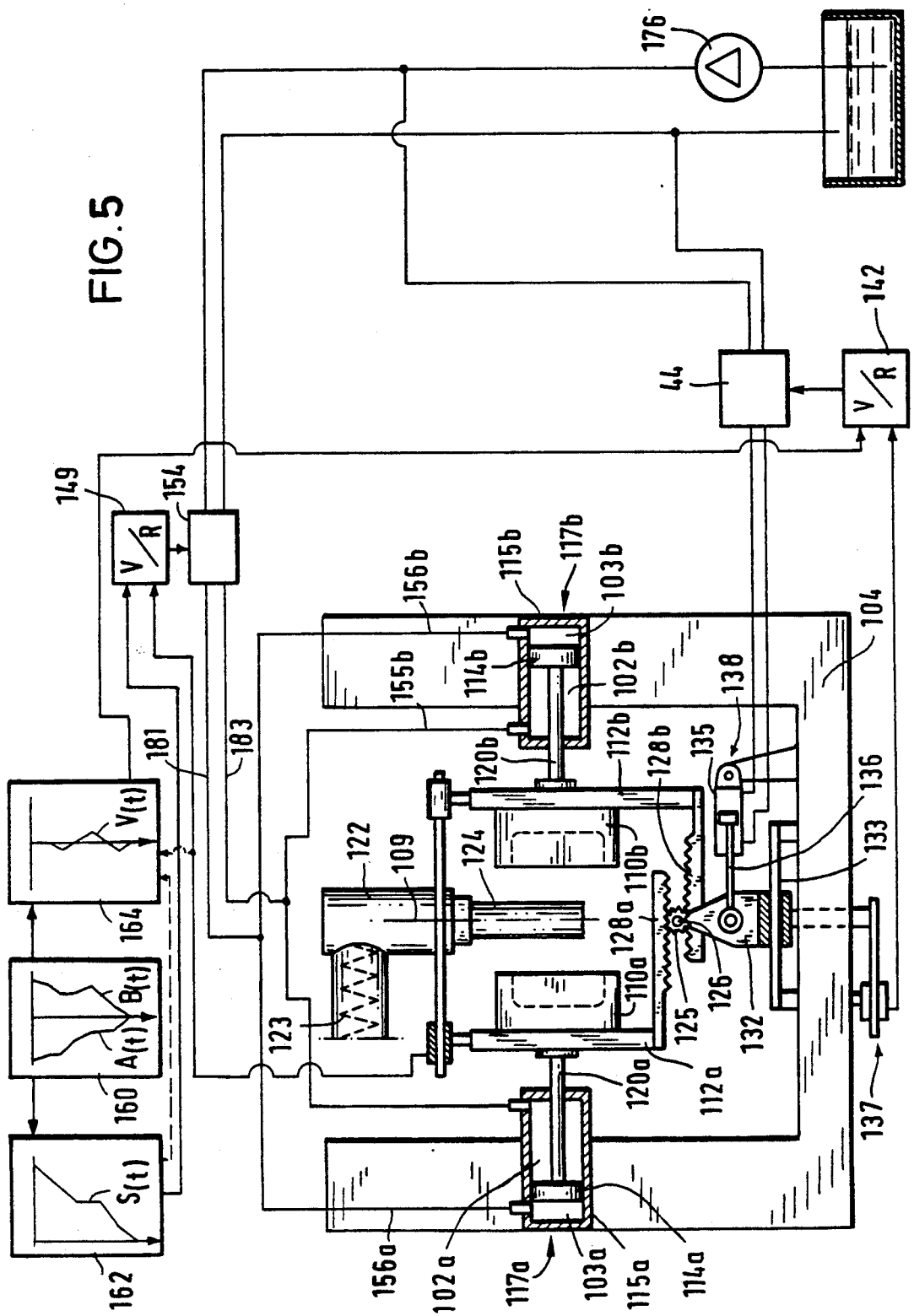
FIG. 5 is a diagrammatic view of a blow molding machine in which a drive means is associated with each blow molding portion.
Figure 6:
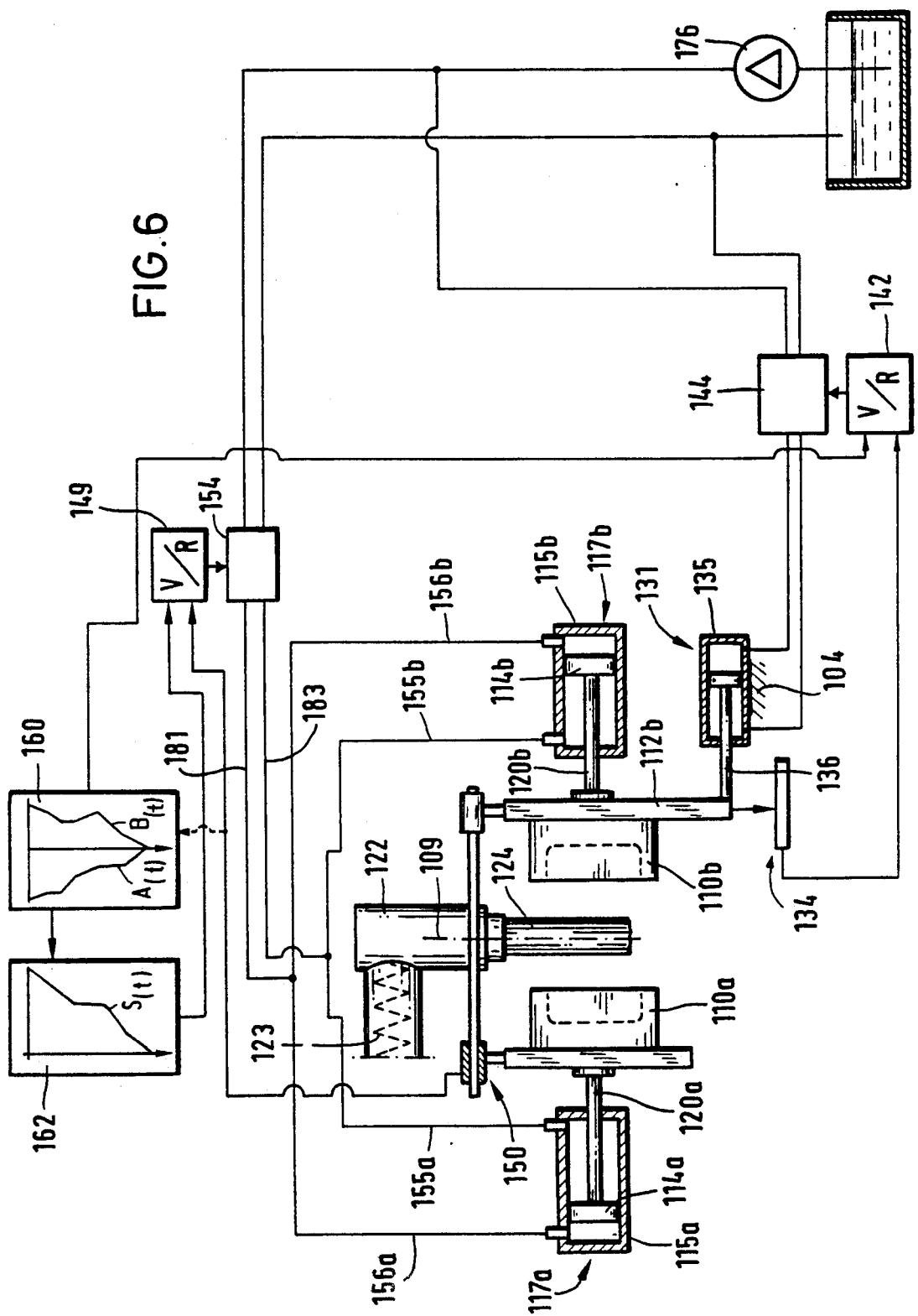
FIG. 6 is a diagrammatic view of another form of the blow molding machine shown in FIG. 5.
Figure 7:
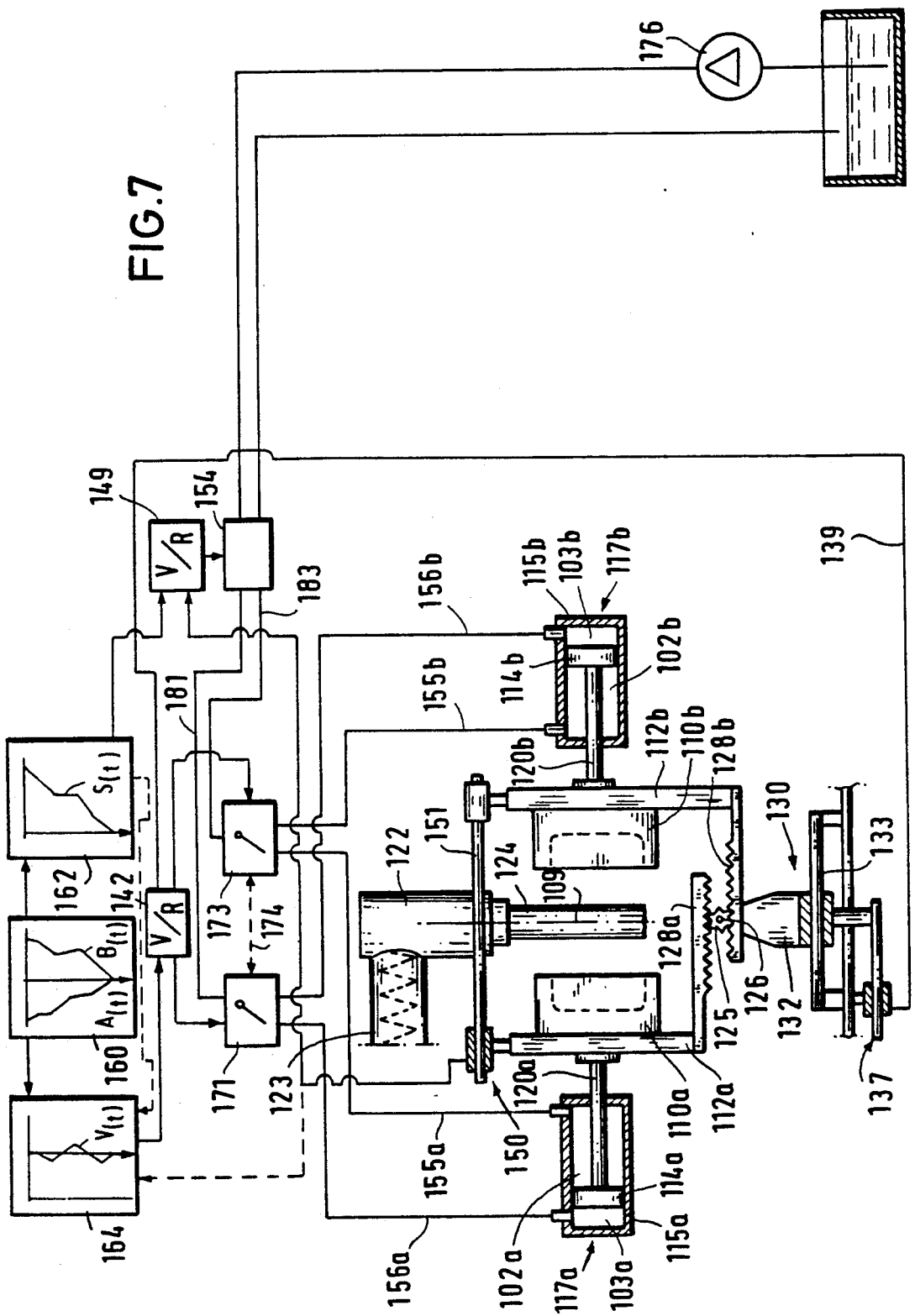
FIG. 7 is a diagrammatic view of yet another form of the blow molding machine shown in FIG. 5.

Referring now to FIGS. 5 through 7, shown therein are embodiments of blow molding apparatuses which have drive systems having a separate drive means for each blow molding mold portion, while in other respects however being substantially the same as the construction shown in FIG. 1. For that reason, in FIGS. 5 through 7 identical components are each denoted by the same reference numerals but increased by 100 in comparison with those used in FIGS. 1 through 4.

The blow molding machine shown in FIG. 5 comprises two blow molding mold portions 110a, 110b which are disposed on carrier plates 112a, 112b. Each of the carrier plates 112a, 112b is engaged by a respective piston rod 120a and 120b of a respective drive means 117a and 117b having a stroke-movement piston 114a and 114b and mounted to the frame structure 104. As in the embodiment shown in FIG. 1, for the purposes of influencing the movements of the mold portions 110a, 110b, a gear 125 is disposed rotatably on a shaft 126 and meshes with two toothed racks 128a, 128b which are each connected to a respective carrier plate 112a, 112b. The holder 132 on which the gear 125 is arranged can be displaced parallel to the opening and closing movements of the mold portions, by way of an additional drive means 138, on the main frame structure 104.

The regulating arrangement for regulating the movements of the mold portions substantially corresponds to that shown in FIG. 1. As there are respective separate drive means 117a and 117b, the hydraulic operating fluid to be supplied is divided into two sub-flows as indicated at 156a and 156b respectively, in the direction of flow downstream of the valve 154 which is provided for controlling the amount of hydraulic operating fluid required for the predetermined movements of the mold portions 110a, 110b. The hydraulic operating fluid which is displaced from the cylinders 115a, 115b respectively is combined upstream of the valve 154 in the direction of flow. Accordingly the hydraulic drive means 117a, 117b are connected to each other by way of the lines 155a, 155b and 156a, 156b in such a way that the chamber 102a in front of the piston 114a communicates with the chamber 102b in front of the piston 114b and the chamber 103a behind the piston 114a communicates with the chamber 103b behind the piston 114b in each of the respective cylinders 115a and 115b.

When the drive means are actuated in the mold-closing direction, the overall amount of operating fluid required for the predetermined closing movement of the mold portions is set by the valve 154 and passed by way of the line 181 and the branch lines 156a, 156b under pressure into the chambers 103a, 103b of the respective drive means 117a, 117b, while at the same time the hydraulic operating fluid is discharged from the chambers 102a, 102b of the drive means by way of the branch lines 155a, 155b and the collecting line 183. When the holder 132 carrying the gear 125 is stationary, as a result of the symmetrical movements that the mold portions are thereby forced to perform, the total feed amount of hydraulic operating fluid is uniformly distributed to the drive means 117a and 117b.

In contrast, displacement of the holder 132 towards the right in relation to the view shown in FIG. 5 gives rise to a greater resistance in relation to the hydraulic operating fluid which flows through the line 156b so that the total feed of hydraulic operating fluid is then distributed in a manner which deviates from uniform distribution. Depending on the extent of the displacement of the holder 132, the drive means 117a receives more hydraulic operating fluid while the drive means 117b receives correspondingly less fluid so that, in accordance with the greater amount of hydraulic operating fluid supplied thereto, the one piston 114a covers an additional distance while, corresponding to the smaller amount of fluid supplied thereto the other piston 114b covers a shorter distance which is reduced by a distance corresponding to the additional distance covered by the piston 114a. The effect of that is that the two mold portions 110a and 110b and therewith the blow molding mold in its entirety experience a displacement in the direction of the displacement of the holder 132, irrespective of the on-going closing movement of the mold portions 110a, 110b relative to each other. As the chambers 102a, 102b and the chambers 103a, 103b form a system which is closed in itself, displacement of the above-indicated kind can be produced even by a drive means 138 which can apply only a substantially smaller force than the two drive means 117a and 117b as it is only resistances which arise out of that displacement, that have to be overcome.

It will be appreciated that it is also possible to provide for displacement of the blow molding mold during opening thereof. In that case the hydraulic operating fluid is supplied to the chambers 102a, 102b of the drive means 117a, 117b, with the hydraulic operating fluid possibly experiencing distribution in accordance with the displacement of the gear 125.

As soon as the holder 132 does not involve any displacement, the arrangement again provides for uniform distribution of the hydraulic operating fluid, irrespective of whether the holder 132 occupies its original central position or has adopted any other position.

As, unlike the embodiment shown in FIG. 1, the embodiment of FIG. 5 provides that the synchronisation arrangement is disposed in the region between the two carrier plates 112a, 112b, the position of the gear 125 also directly defines the position of the central plane which divides in half the distance between the two mold portions 110a, 110b. In other words, the shaft 126 is positioned in each case in that central plane. In FIG. 5 the gear 125 is in its neutral position, in other words, the above-mentioned central plane between the mold portions coincides with the central plane 109 which is defined by the preform or parison 124.

Referring now to FIG. 6, the embodiment shown therein corresponds to that shown in FIG. 5, except that displacement of the blow molding mold is produced by an additional drive means indicated at 131, which is disposed between the carrier plate 112b and the main frame structure which is not shown in FIG. 6 but which is indicated at 104 in FIG. 5. The additional drive means 131 must accordingly follow the travel-time characteristic of the mold portion 110b, which is predetermined by the programmer 160. Therefore the regulating elements provided for that drive means 131 correspond to those of the blow molding apparatus shown in FIG. 4. If for example in accordance with the program stored in the programmer 160, the mold portion 110b, in the closing phase thereof, is to perform a slower movement relative to the central plane 109 of the preform 124, the additional drive means 131 is then actuated in such a way that the carrier plate 112b performs the movement allocated thereto by the program. The result of that is that the total amount of operating fluid which is supplied by way of the collecting line 181 is subjected to distribution in which the drive means 117a receives more hydraulic operating fluid and the drive means 117b receives corresponding less hydraulic operating fluid, so that the drive means 117a and 117b and the mold portions perform the desired asymmetric movement relative to the reference plane 109.

An important consideration in both these embodiments is that the points at which the lines 181 and 183 branch to form the branch lines 155a, 155b and 156a, 156b are downstream of the valve 154 which sets the volume flow of hydraulic operating fluid which is required to produce the predetermined movements of the blow molding mold portions in the closing or opening direction. It would be inappropriate to adopt an arrangement in which each of the two drive means 117a and 117b has its own valve similarly to the valve 154 and/or its own regulating circuit, as in such a configuration, particularly in the last phase of the closing operation in which elevated forces must be applied for example for squeezing waste material off the preform, coordination of the two regulating circuits relative to the reference plane could not be achieved or could be achieved only at extremely high cost, because it is not possible to make a clear separation in terms of functions between opening and closing of the blow molding mold on the one hand and displacement of the mold on the other hand.

FIG. 7 shows another possible construction for producing displacement of the blow molding mold, in addition to the opening and closing movements of the mold portions 110a, 110b, in a blow molding machine which has a separate hydraulic drive means for each mold portion. As already discussed hereinbefore, in a blow molding apparatus of that kind, displacement of the connecting element of the synchronisation arrangement or the fact that a mold portion is forced to follow the specified travel-time characteristic by virtue of an additional drive means, provides that the total amount of hydraulic operating fluid supplied is subjected to non-uniform distribution in such a way that the respective amount of hydraulic operating fluid supplied to a drive means corresponds to the predetermined movement of the respective mold portion, in accordance with the value which is inputted in the programmer 160. The predetermined movements of the mold portions relative to each other are produced by the total amount of hydraulic operating fluid supplied, in accordance with the desired or reference value which is set by the calculating unit 162, the amount of fluid being governed by the valve 154 before the fluid is distributed into the branch lines 155a, 155b, 156a, 156b. Having regard to the fact that the hydraulic operating fluid has to be distributed in any case, in the embodiment shown in FIG. 7 distribution of the operating fluid is not necessarily effected by virtue of a force which additionally acts on at least one of the mold portions, but by a distributor device.

For that purpose, as in the embodiment shown in FIG. 5, the FIG. 7 configuration has a programmer 160 storing the travel-time characteristics or speed characteristics for each mold portion 110a, 110b relative for example to the central plane 109 of the preform. The resulting distance-time characteristic or speed characteristic of the mold portions relative to each other is ascertained in the calculating unit 162 and preset for a comparison and regulating device 149 which controls the valve 154 which in turn sets the amount of hydraulic operating fluid required for the respective predetermined movement.

The programmer 160 is also connected to a calculating unit 164 which ascertains the displacement of the blow molding mold which is required for the desired asymmetric movement of the mold portions relative to the central plane 109 of the preform, and which corresponds to a given mode of distribution of the total amount of hydraulic operating fluid supplied, to the two drive means 117a and 117b. The relationships in accordance with which the operating fluid is to be distributed are preset in the comparison and regulating unit 142 which respectively controls a quantitative distribution valve 171 for the feed volume flow 181 of hydraulic operating fluid and a quantitative distribution valve 173 for the displaced volume flow 183 of hydraulic operating fluid; the designations 'feed volume flow' and 'displaced volume flow' each refer to the closing movements of the mold portions. In the opening movements thereof, the direction of flow of the volume flows is in the opposite direction. The drive means 117a and 117b are connected to the respective outputs and inputs of the quantitative distribution valves 171 and 173 by way of the lines 156a, 156b and 155a, 155b.

For the purposes of detecting the actual value in respect of the displacement performed by the blow molding mold, the apparatus has a measuring pick-up 137 which is connected by way of a signal line 139 to the comparison and regulating device 142 which corrects the positions of the valves 171 and 173 in dependence on a deviation of the actual value from the desired or reference value which is calculated in the calculating unit 164. It may be desirable for the valves 171 and 173 to be coupled together by way of a line 174 as, by virtue of the almost complete incompressibility of the hydraulic operating fluid, the displaced volume flow at least approximately corresponds to the feed volume flow of operating fluid.

The measuring pick-up 137 is disposed on a displaceable synchronisation arrangement 130, the structure of which corresponds to those shown in FIGS. 1, 2 or 5, so that displacement of the gear 125 corresponds to the actual displacement of the blow molding mold. Here too, the position of the shaft 126 directly defines the central plane of the mold, as it is disposed in that central plane. It is also possible however for the measuring pick-up to be arranged for example on a mold portion or on a carrier plate, in which case of course the valves 171, 173 are set in dependence on the comparison of the actual position of the corresponding mold portion with the travel-time characteristic in respect of that mold portion.

Furthermore, in an embodiment as shown in FIG. 5 in which displacement of the mold is produced by an additional drive system which results in suitable distribution of the hydraulic operating fluid, it is possible additionally to provide a distributor device for the total feed amount of hydraulic operating fluid. In such an arrangement, setting of the quantitative distribution valves which are required for that purpose and which for example may correspond to the valves 171 and 173 may be effected in dependence on the displacement of the connecting element.

For reasons of enhanced clarity, the synchronisation arrangements 30, 130 are illustrated in the corresponding Figures, without the option of an arresting action. However, an arresting action for displaceable synchronisation arrangements is readily possible by virtue of the use of conventional means, for example claws or pins engaging into a recess, or by means of frictional engagement. For that reason such means do not need to be illustrated and described in greater detail herein.

Figure 8:
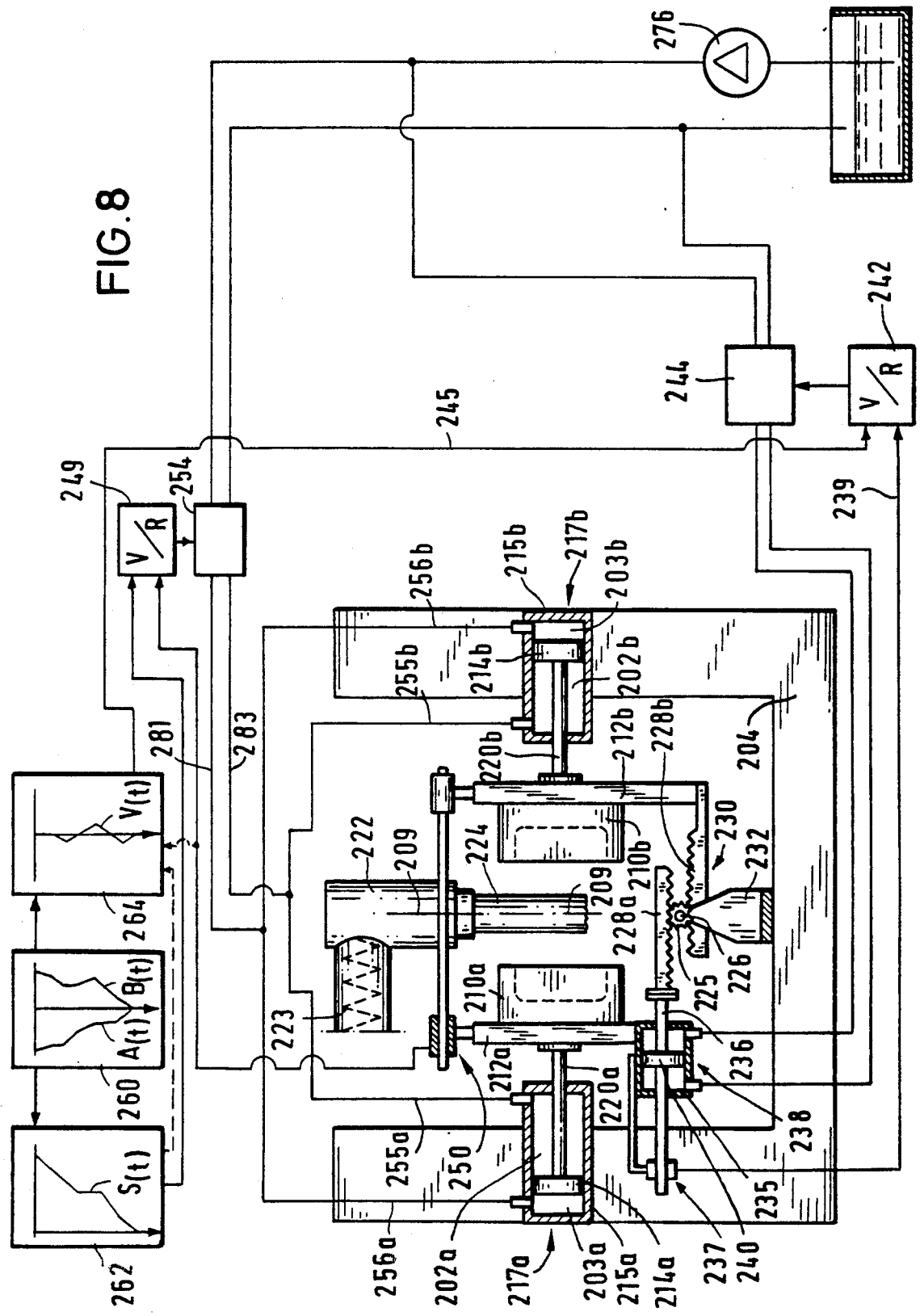
FIG. 8 is a diagrammatic view of a blow molding machine in which a component of the synchronisation arrangement is variable in respect of its effective length.
Figure 9:
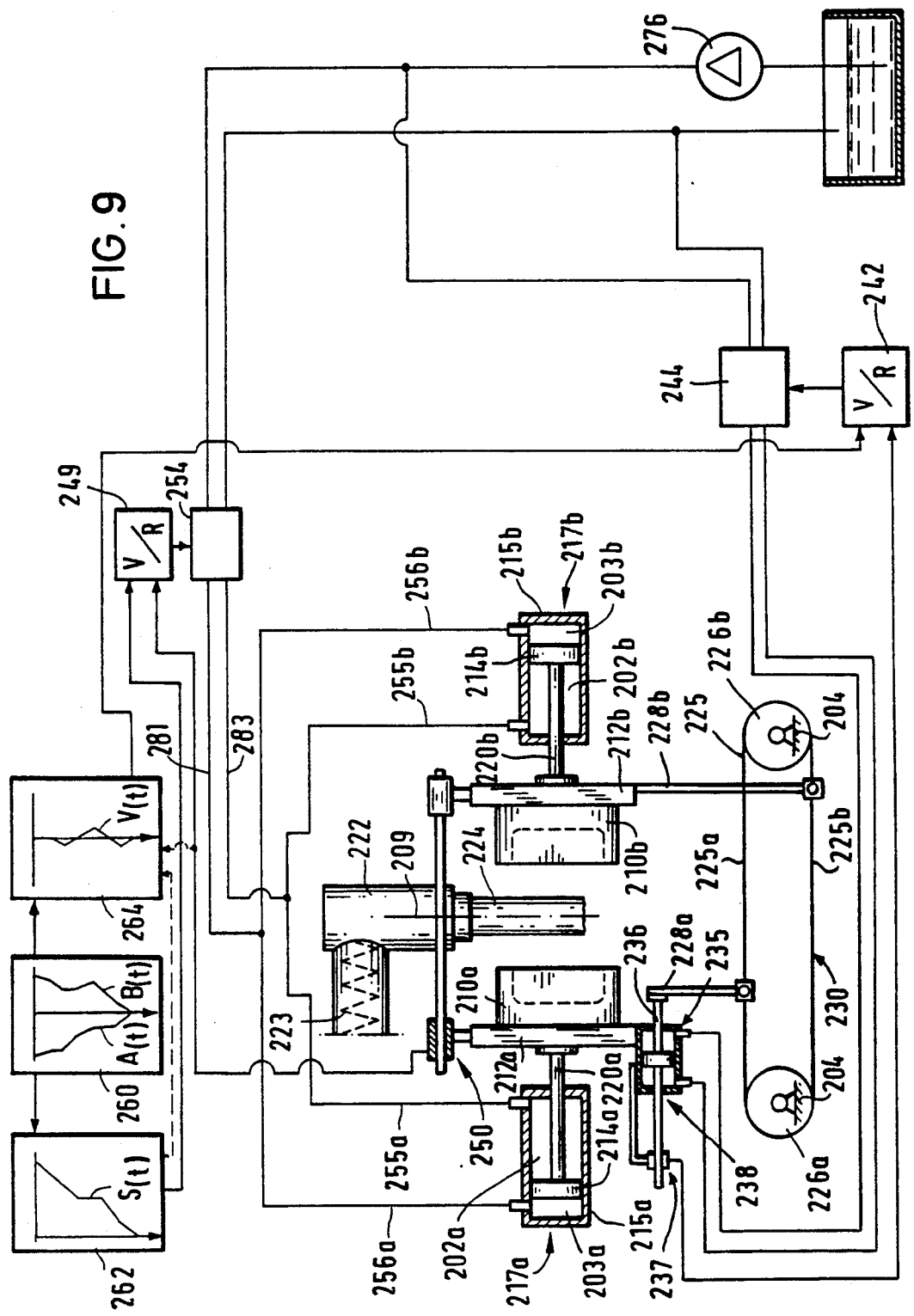
FIG. 9 is a diagrammatic view of a modification of the machine shown in FIG. 8.
Figure 10:
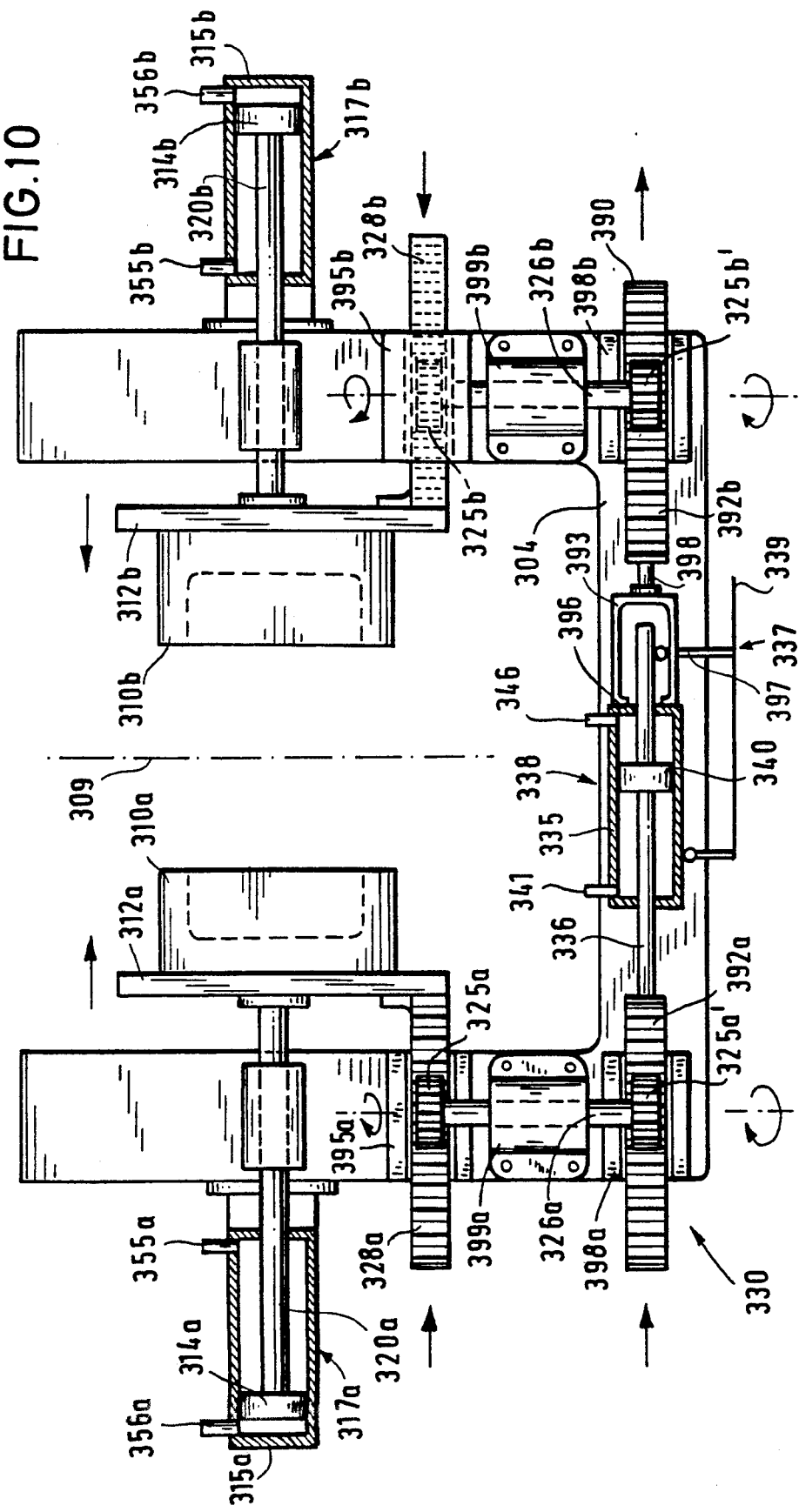
FIG. 10 is a diagrammatic view of a further modification of the machine shown in FIG. 8.

FIGS. 8 through 10 also show embodiments of blow molding apparatuses in which each blow molding mold portion is provided with a separate drive means. The two embodiments shown in FIGS. 8 and 9 are substantially the same as the embodiment shown in FIG. 5, and in principle also they are the same as that shown in FIG. 1, so that in FIGS. 8 and 9, components which correspond to those of the above-described embodiments are identified by the same reference numerals which however are increased by 100 in comparison with FIG. 5 and thus increased by 200 in comparison with FIG. 1.

The embodiment shown in FIG. 8 also has a synchronisation arrangement comprising a gear 225 and two toothed racks 228a and 228b. In this embodiment however the holder 232 which carries the shaft 226 for the gear 225 is fixedly mounted to the machine frame structure 204. A further difference in relation to the embodiments shown in FIGS. 1 and 5 is that one of the two racks, namely the rack 228a, is carried by the piston rod 236 of a piston 240 slidable in a cylinder 235, and in practice represents an extension of that piston rod 236. The cylinder 235 of the drive means 238 is fixedly connected to the carrier plate 212a for the mold portion 210a.

Unlike the embodiments shown in FIGS. 1, 2, 3 and 5, the movement of the mold portions 210a and 210b is therefore not produced by displacement of the gear 236, but by virtue of a variation in the effective length of another connecting element of the synchronisation arrangement, namely the rack 228a. The above-mentioned variation in effective length is effected by suitable actuation of the piston 240 in the cylinder 235, by means of the valve 244 which is controlled by a comparison and regulating unit 242 in the manner already described in connection with FIGS. 1 and 5. The unit 242 is communicated by way of the line 245 with the calculating unit 264 for calculating the respective desired or reference distance of the central plane between the mold portions, relative to the central plane 209 of the preform 224. The position of the central plane of the mold portions is determined by the position of the piston 240 relative to the cylinder 235 and thus relative to the carrier plate 212a which carries that cylinder 235. In the view shown in FIG. 8, the piston 240 is in its neutral, that is to say central, position in which the central plane of the two mold portions 210a, 210b coincides with the central plane 209 which is defined by the preform 224. Actuation of the cylinder 235 at one of the two sides of the piston 240, by virtue of the resulting longitudinal displacement of the rack 228a, results in displacement in the same direction of both mold portions 210a, 210b so that, in a manner corresponding to displacement for example of the gear 125 in the FIG. 5 embodiment, the central plane which divides in half the respective spacing between the two mold portions 210a, 210b is displaced relative to the central plane 209 defined by the preform 224. This embodiment differs from the above-described constructions with a synchronisation arrangement in which the gear is displaced, in that the desired or reference value which is calculated in the calculating unit 264, for the necessary displacement of the blow molding mold, is twice as great as in the embodiments for example of FIGS. 1 and 5. A further difference in comparison with the construction shown in FIG. 5 is that the travel pick-up 237 which detects the variation in length of the rack 228a and passes it by way of the line 239 as an actual value to the comparison and regulating unit 242 is associated with the rack 228a and the cylinder 235.

The embodiment shown in FIG. 9 is the same in all essential details as that shown in FIG. 8 so that the same reference numerals are used to identify mutually corresponding components. The only difference between the two constructions concerns the configuration of the synchronisation arrangement which in FIG. 9 comprises a chain, cable or similar endless flexible member as indicated at 225, which is passed around two spaced-apart wheels, pulleys or the like as indicated at 226a and 226b. The two wheels or like members 226a, 226b are mounted rotatably on the machine frame structure 204.

The arrangement is such that the directions in which the chain or like member 225 moves extend parallel to the directions in which the two mold portions 210a, 210b perform their opening and closing movements. Both mold portions 210a and 210b or the carrier plates 212a and 212b thereof are connected to the endless member 225 by way of substantially rigid connecting elements 228a and 228b in such a way that the connecting element 228a is connected to the one section 225a of the endless member 225 while the other connecting member 228b is connected to the other section 225b of the endless member 225. When the member 225 is moved around the two wheels or like members 226a, 226b, the two sections 225a and 225b of the endless member 225 perform movements in opposite directions, corresponding to the movements performed by the respectively associated mold portions 210a and 210b. The connecting element 228a is mounted to the piston rod 236 of a piston slidable in a cylinder 235. In the construction shown in FIG. 8, the latter is fixedly connected to the carrier plate 212a of the mold portion 210a. It will be seen that, apart from the different configuration of the synchronisation arrangement, the mode of operation is the same as in the embodiment of FIG. 8.

Which of the synchronisation arrangements shown for example in FIGS. 8 and 9 is preferred, essentially depends on the spatial and structural factors of the apparatus generally. In many cases it is not possible for the synchronisation arrangement to be disposed directly beneath the two mold portions as the space available at that location is required for other items of equipment, for example a blowing tube member for introducing the blowing agent into the preform, mandrel members for spreading the lower end of the preform, and the like. In such a situation for example the FIG. 9 embodiment could be preferred.

In regard to practical design, the endeavor will generally be to arrange the point of engagement of the synchronisation arrangement with the carrier plate, for the application of force thereto, in the vicinity of the guide means for the carrier plate or in the vicinity of the points of engagement of the drive means for producing the opening and closing movements of the mold portions.

The latter aspect is particularly taken into consideration in the embodiment shown in FIG. 10 in which components corresponding to the construction shown in FIG. 1 are identified by the same reference numerals but increased in each case by 300.

The embodiment shown in FIG. 10 also has a separate drive means 317a and 317b for each mold portion. In a similar manner for example to the FIG. 5 embodiment, each of the two carrier plates 312a and 312b is provided with a toothed rack 328a and 328b of a synchronisation system; however, the racks 328a and 328b are each mounted to the side of the respective carrier plate, which is away from the respectively associated mold portion 310a and 310b. Furthermore the teeth are arranged on opposite sides in such a way that, looking at the view in FIG. 10, the teeth on the rack 328a are towards the viewer while the teeth on the rack 328b are disposed at the side of the rack which is away from the viewer. That arrangement gives rise to the same direction of rotation of all gears 325a, 325b; 325a', 325b' upon opposite directions of movement of the carrier plates 312a, 312b or the racks 328a, 328b associated therewith.

In a departure from the above-described embodiments, a gear 325a, 325b is associated with each of the two racks 328a, 328b. Each gear is fixedly connected to a respective shaft 326a and 326b which, extending downwardly from the respectively associated gear 325a, 325b, terminates in a region which, looking at FIG. 10, is beneath the carrier plates 312a, 312b or the mold portions 310a, 310b carried thereby. At its lower end, each of the two shafts 326a, 326b carries a respective gear 325a' and 325b' respectively. A common rack 390 is associated with those two gears 325a' and 325b'. The rack 390 has two rack portions 392a, 392b which are connected together by a piston-cylinder unit 338. The piston 340 which is slidable in the cylinder 335 of the unit 338 has a piston rod 336 of which one end is fixedly connected to the rack portion 392a which meshes with the gear 325a'. The other end of the rack 336 carries a portion 397 of a travel pick-up or detector 337 by which the actual position (actual value) of the piston 340 relative to the cylinder 335 is detected and passed by way of a line 339 to a comparison and regulating unit which corresponds for example to the comparison and regulating unit 242 in FIG. 9. The end region of the piston rod 336, which carries the portion 397 of the travel pick-up 337, is passed through the end wall 396 of the cylinder 335, the aperture required for that purpose in the end wall 396 being provided with sealing means to prevent the hydraulic pressure fluid from escaping therefrom. The connection between the portion 392 of the rack 390 and the cylinder 335 is made by way of a connecting rod 398 and a housing 393 which is fixedly connected to the cylinder 335 and which is provided with a slot-like opening for the portion 397 of the travel pick-up 337.

In the embodiment shown in FIG. 10, the rack 390 represents the kinematic connecting member, which is adjustable in respect of its length, of the elements of the synchronisation arrangement 330 which are associated with the respective mold portions 310a, 310b. The rack 390 is arranged to reciprocate in the direction of its longitudinal axis so that it can follow the rotary movements of the two gears 325a', 325b', by performing a corresponding longitudinal displacement. Because, as described above, the upper two gears 325a and 325b mesh with the racks 328a and 328b respectively on opposite sides thereof, they perform rotary movements in the same direction, in spite of the mutually oppositely directed opening and closing movements of the mold portions. The rotary movements of the gears 325a and 325b are transmitted to the respective gears 325a' and 325b' driven thereby, so that the rack 390 can provide for synchronisation of the two mold portions 310a and 310b.

In that respect, the piston-cylinder unit 338 performs the function of the drive means 238 of the two embodiments shown in FIGS. 8 and 9. Accordingly the two lines 341 and 346 are connected to a valve which performs the function of the valve 244 in the embodiments of FIGS. 8 and 9. When the travel pick-up 337 and the connecting line 339 are included, that then gives the circuit which is also shown in FIGS. 8 and 9. That also applies in regard to the other components and assemblies which can also be designed in the manner shown in FIGS. 8 and 9 or in a manner corresponding to FIG. 7, although in that case the piston-cylinder unit 338 would only perform the function of a position-establishing device.

The guide means illustrated at 395a, 395b in FIG. 10, for the respective racks 328a and 328b, the guide means 398a, 398b for the respective rack portions 392a, 392b and the guide means 399a, 399b for the respective shafts 326a and 326b are each stationarily mounted on the machine frame structure 304.

Figure 11:
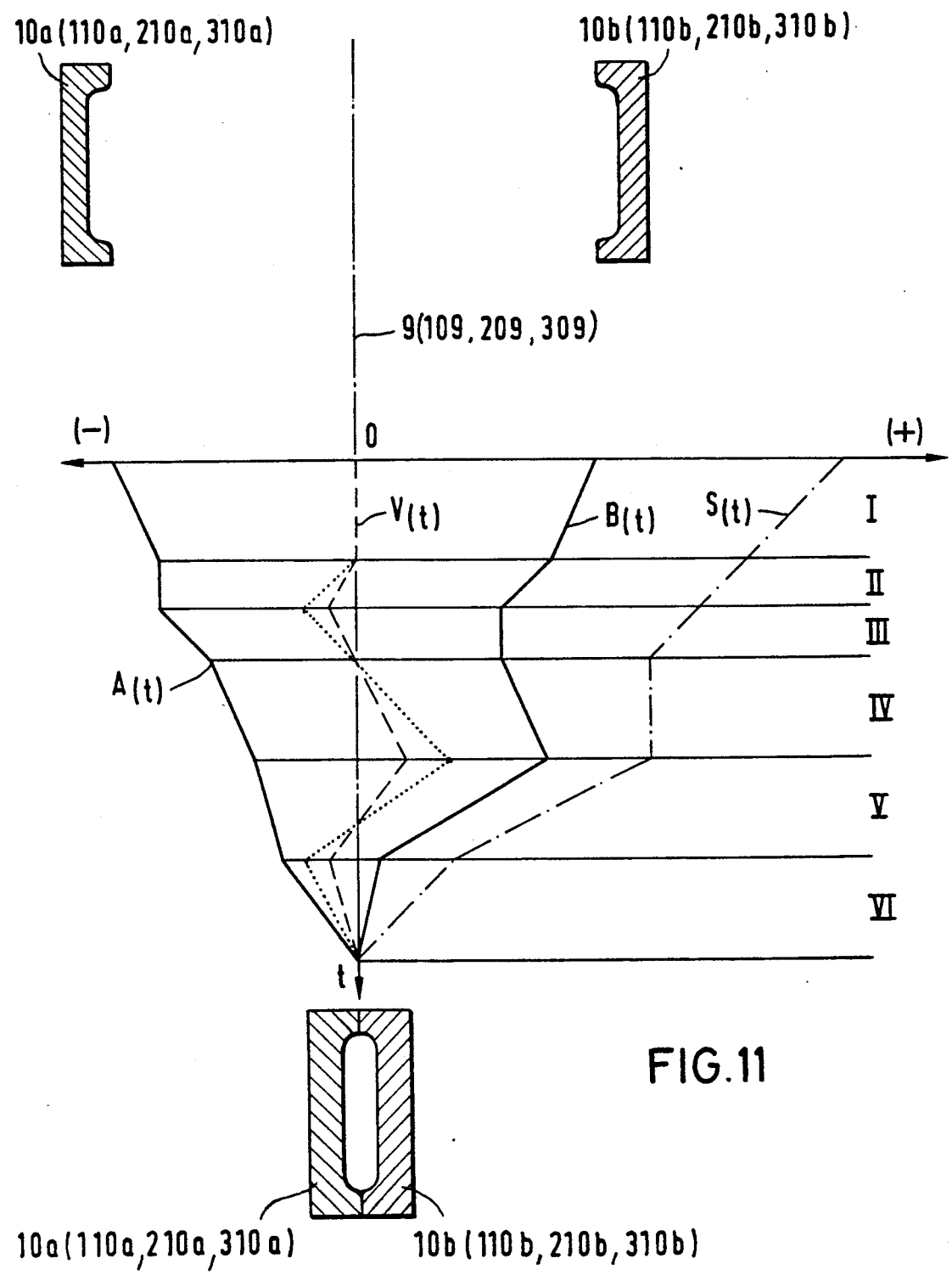
FIG. 11 is a diagram showing a travel-time characteristic of the blow molding mold portions with the resulting distance-time characteristic and the displacement travel-time characteristic of the blow molding mold upon closure of the blow molding mold.

Referring now to FIG. 11, diagrammatically shown therein are travel-time characteristics A(t), B(t), which are possible in relation to a closing phase of the individual mold portions 10a; 110a; 210a; 310a and 10b; 110b; 210b; 310b relative to the neutral plane 9; 109; 209; 309 of the preform, the resulting spacing-time characteristic S(t) of the mold portions relative to each other and the resulting necessary displacement characteristic V(t) (as shown in broken line) of the blow molding mold in its entirety. The travel or distance covered is plotted on the horizontal axis, with the zero-value point being on the neutral central plane 9; 109; 209; 309. The travel-time characteristics A(t), B(t) are stored for example in the programmer 60; 160; 260. On the basis of those preset data, the spacing-time characteristic S(t) of the mold portions 10a, 10b; 110a, 110b; 210a, 210b; 310a, 310b relative to each other is calculated in the calculating unit 62; 162; 262. The spacing-time characteristic V(t) of the central plane of the mold portions relative to the neutral plane 9; 109; 209; 309 of the preform is ascertained in the calculating unit 64; 164; 264. The distance-time characteristic V(t) corresponds to the displacement-time characteristic of the blow molding mold or the central plane of the mold portions thereof.

In time section I of the diagram in FIG. 11, the mold portions move symmetrically, that is to say at the same speed, towards the neutral plane 9; 109; 209; 309 of the preform, which in this respect coincides with the central plane of the blow molding mold. Accordingly the mold is not subjected to any additional displacement. The speed at which the mold portions move towards each other is twice as great in time section I as the speed of an individual mold portion relative to the reference plane 9; 109; 209; 309. With symmetrical movements of the mold portions in that way, relative to any reference plane, it may be desirable for the connecting element which is possibly provided and which is variable in respect of position or length, for example the gear 25 in FIG. 1 or the piston 240 or 340 in FIGS. 8 through 10, to be fixed in such a way that the respective connecting element does not undergo any variation in regard to its position or its effective length. The connecting element such as the gear or piston can be fixed in that way in the neutral position thereof in which the central plane of the mold portions coincides with the neutral plane 9; 109; 209; 309 of the preform.

In time section II the mold portion 10a, 110a, 210a, 310a does not perform any movement although the closing speed of the mold portions relative to each other remains unaltered. In this case the connecting element of the synchronisation arrangement moves out of its neutral position with the result that the central plane of the blow molding mold is displaced towards the mold portion 10a, 110a, 210a, 310a, corresponding to the extent of the movement of the connecting element, following the line V(t). The additional drive system which drives the displaceable connecting element in the constructions shown in FIGS. 1, 3 and 5 must accordingly cover precisely that distance V(t). In the embodiment shown in FIG. 5, that is achieved by virtue of the fact that the total feed amount of operating fluid goes exclusively to the drive means which is associated with the mold portion to be moved.

In time section III, the mold portion 10b, 110b, 210b, 310b does not perform any movement, under corresponding conditions, so that the operating conditions in this phase III are reciprocal to those in phase II.

In the construction shown in FIG. 6 in which the displacement is produced by an additional drive means disposed between the carrier plate and the main frame structure, it is possible to make a distinction between two situations. If the mold portion 110b which is connected to the additional drive means 131 is not to perform any movement, the additional drive means is stopped. In that respect, it may be desirable or possibly even necessary for the additional drive means to be locked in the desired position relative to the main frame structure 104, so as to prevent any undesirable movements from occurring. In that way the entire feed amount of hydraulic operating fluid serves exclusively for driving the other mold portion, the amount of operating fluid corresponding to the curve S(t). In the other situation, that is to say when that mold portion 110a which is not connected to the additional drive means 131 is not to perform a movement, the additional drive means performs the predetermined movement of the mold portion 110b connected to the additional drive means. In that case, that movement at the same time also corresponds to the stroke movement of the drive means 131 for the mold-closing movement and the drive means for the stationary mold portion does not receive any hydraulic operating fluid. In this case also it may be desirable for that mold portion to be locked in relation to the main frame structure.

In the embodiment shown in FIG. 7 which does not have an additional drive system, the quantitative distribution valve would be set in phase II and III respectively in such a way that the valve spool of the valve 171, or the corresponding operational element thereof, completely closes off the feed line associated with the stationary mold portion, so that the previously established amount of hydraulic operating fluid is passed exclusively to the drive means which is connected to the respective mold portion which is to be moved.

Time section IV involves displacement of the blow molding mold without a closing movement of the mold portions occurring at the same time. In other words, the distance between the mold portions remains unaltered during phase IV. In this phase the curve S(t) extends parallel to the time axis of the FIG. 11 diagram. The mold portions 10a, 110a; 10b, 110b as well as the curve V(t) move at the same speed and in the same direction from left to right. In the case of the embodiments shown in FIGS. 5, 6 and 8 through 10, the chambers in front of and behind the pistons 114a, 114b; 214a, 214b; 314a, 314b would have almost no differences in pressure therein so that displacement of the mold only causes the hydraulic operating fluid in those chambers to be displaced from one cylinder into the other, without operating fluid being supplied to or discharged from the cylinders through the lines 181, 183. In a blow molding apparatus as shown in FIG. 7, it is not possible to have displacement of the mold without an opening or closing movement, as that apparatus does not have an additional active drive system.

In time section V the mold portion 10b, 110b, 210b, 310b, moves more quickly towards the central plane 9, 109, 209, 309 or the zero-point plane O, while in the last time section VI the mold portion 10a, 110a, 210a, 310a moves more quickly. In the course of such movements, the blow molding mold performs an additional displacement at a speed which corresponds to half the sum of the speeds of the individual mold portions, and towards the mold portion which is moved more slowly; the respective speeds are identified by the signs (+, −) corresponding to the respective direction thereof. That condition applies in general terms.

In the embodiments shown in FIGS. 1, 3 and 5 in which displacement of the mold in its entirety is produced by a variation in position of one of the components of the synchronisation arrangement, the characteristic of the displacement V(t) of the mold, as shown in broken lines in FIG. 11, is the same as the extent of the displacement performed by the respective adjustable component of the synchronisation arrangement. If in contrast displacement of the blow molding mold is produced by a variation in length of a component of the synchronisation arrangement, as is the case with the constructions shown in FIGS. 8 through 10, the displacements, which are required for that purpose, of the members which produce the variation in length, are twice as great as in the case of the other embodiments in which for example the gear 25 or 125 of the synchronisation arrangement is displaced. That is to be attributed to the fact that displacement of the respective gear which acts on both mold portions by way of the racks 28a, 28b or 128a, 128b co-operating with the gear, relative to the blow molding mold in its entirety and thus relative to the central plane thereof, results in a displacement of double the extent of that which occurs in the embodiments shown in FIGS. 8 through 10 which each involve only varying the length of a member of the synchronisation arrangement, so that there is no doubling of the effect produced. The extent of the displacement of the piston 240, 340, which is required to produce the displacement V(t) of the central plane of the blow molding mold, is shown as a dotted line in FIG. 11. It is in each case twice as great as the value V(t) of displacement of the central plane.

In principle, the desired or reference values in respect of the closing movement and the opening movement of the mold portions and for additional displacement of the mold can be obtained by the travel-time characteristics A(t) and B(t) being entered in a co-ordinate system whose time axis extends along the neutral plane 9; 109; 209; 309 and whose travel axis extends parallel to the opening and closing movements. The distance-time characteristic of the mold portions relative to each other then arises out of the following equation:

$$S(t) = B(t) - A(t)$$

when B(t) is plotted on the positive portion of the travel axis and A(t) is plotted on the negative portion thereof, with the zero-value point being on the central axis 9, 109, 209, 309.

The desired or reference value in respect of the necessary displacement of the adjustable connecting member and therewith the blow molding mold, in respect of the embodiments with a displaceable gear 25; 125 or the control lever 81 in the synchronisation arrangement, then arises out of the following equation:

$$V(t) = (A(t) + B(t))/2$$

wherein the respective sign used defines the position, relative to the zero line. That corresponds to the broken-line characteristic in FIG. 11.

In the embodiments shown in FIGS. 8 through 10 in which a component of the synchronisation arrangement is varied in regard to its effective length, the reference or desired value in respect of the required displacement of the piston 240; 340 out of the neutral position arises out of the following equation:

$$V(t) = A(t) + B(t).$$

That corresponds to the dotted-line curve in FIG. 11, in which respect the effective movements of the mold portions and the blow molding mold as an entirety are the same as those of the broken-line curve.

At any event it is possible in accordance with this invention to provide for virtually any travel-time characteristic in respect of the mold portions, relative to the central plane of the preform.

When employing the usual synchronisation arrangements, the transmission ratios of the co-operating components are 1:1. It is also possible however to use other transmission ratios which then result in corresponding variations in the relationships between the movements of the individual members.

Figure 12:
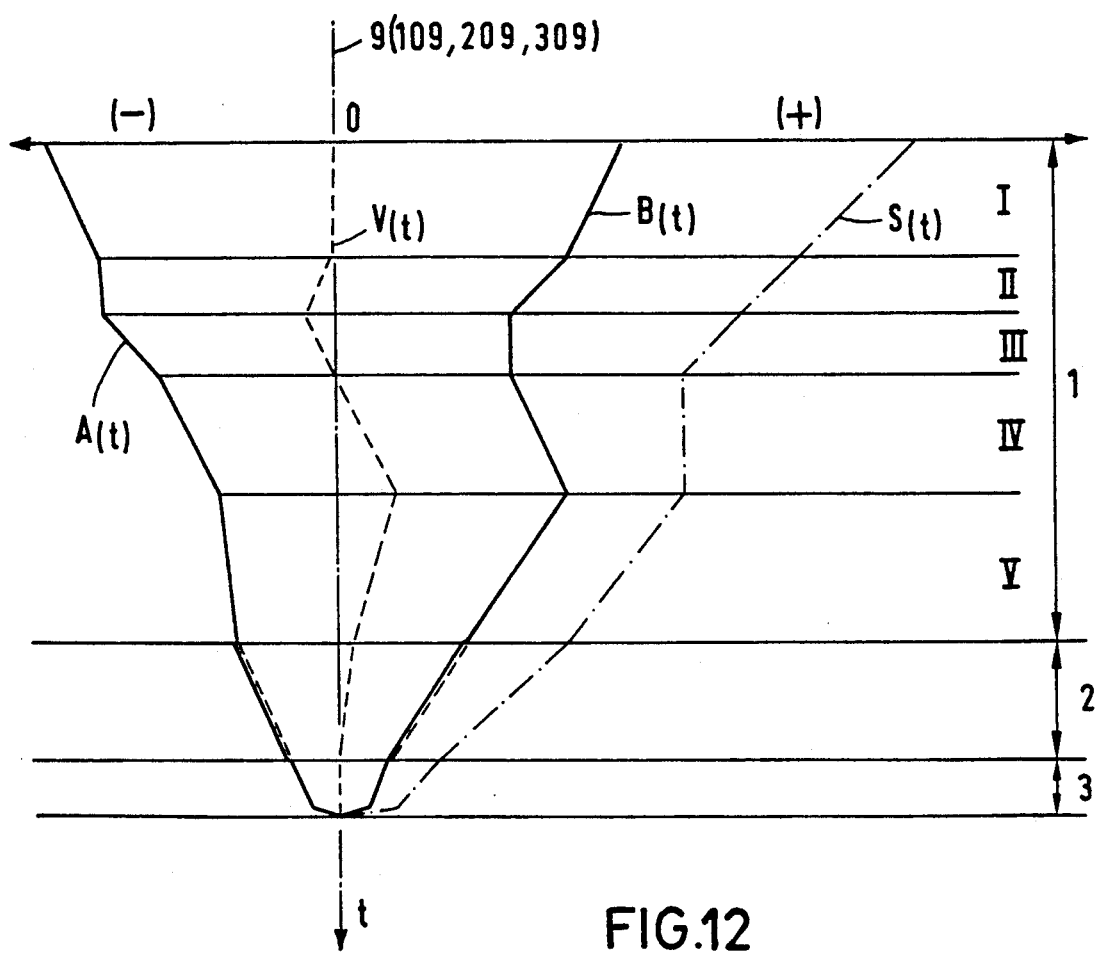
FIG. 12 shows another travel-time characteristic of the blow molding mold portions with the resulting distance-time characteristic and the displacement-time characteristic of the blow molding mold upon closure thereof.

Referring now to FIG. 12, shown therein is another possible configuration of movements of the blow molding mold portions during the closing phase which is divided into three sections 1-3. In section 3 at the end of the closing phase, the mold portions 10a, 10b; 110a, 110b; 210a, 210b; 310a, 310b are involved in movements which satisfy the requirements for squeezing off the waste material and welding the seam regions of the preform. The movements A(t) and B(t) of the mold portions can be preset in section 1 of the movements at the beginning of the closing phase. In this case such movements comprise time sections I-V which corresponds to time sections I-V in FIG. 11 and therefore do not need to be described in further detail here. Section 2 represents a transitional region in which the mold portions are moved from their end position after their movement in section 1 into the starting position for section 3. For mold portion movements which are divided up in that way, it is desirable to provide a program which has three program portions, corresponding to the three sections 1-3. Any travel-time characteristics A(t), B(t) can be preset in the first program portion, while the second program portion involves calculation of the movements of the mold portions so that the latter go from the end positions of the first program portion into the starting positions of the third program portion which is fixedly preset within the program. As described above, that program portion stores the movements which are required for squeezing off the waste material and for welding the seam regions, in the respective situation of use involved.

The characteristics shown in FIGS. 11 and 12 are made up of sharply delineated sections, for the sake of enhanced understanding of what is involved. It will be desirable however to provide curve characteristics which have transitional regions.

Although, in the above-described embodiments, the movements of the mold portions and the blow molding mold as a unit are always described and illustrated as occurring during the closing operation, it will be appreciated that it is also possible to produce such movements in a corresponding manner when the blow molding mold is being opened.

It should also be noted in relation for example to the embodiment illustrated in FIG. 8 having a rack whose effective length can be varied, that the other rack may also be so designed or arranged that its effective length can be varied. It is furthermore possible in the embodiment shown in FIG. 1 which has only one common drive means for the opening and closing movement of the mold portions for the synchronisation arrangement which has a gear which is variable in position to be replaced by a synchronisation arrangement in which one of the two racks is variable in respect of its effective length, which therefore is of a similar configuration for example to the embodiment shown in FIG. 8. In that case also, the reference value V(t) in respect of displacement of the piston in the actuating cylinder of the synchronisation arrangement is calculated in accordance with the above-indicated equation applying to the embodiments shown in FIGS. 8 through 10.

Finally, it is also possible, in a similar manner to the embodiment shown in FIG. 7, for the component of the synchronisation arrangement which is variable in respect of its effective length to be used only as a travel pick-up or detector device in order to detect the actual value of the displacement which has actually been performed by the blow molding mold in its entirety.

It will be appreciated that the process of producing hollow bodies from thermoplastic material by blow molding and the above-described apparatuses for carrying out such processes have been set forth solely by way of example and illustration of the principles of the present invention and that various modifications and alterations may be made therein without thereby departing from the spirit and scope of the invention.

It will be noted in that respect that where reference numerals are incorporated in the appended claims they serve only for the purposes of ease of identification of the components involved without constituting a limitation on the scope of the invention as claimed.

What is claimed is:

1. A blow molding process employing an apparatus including a blow mold having at least first and second mold portions and a first drive system coupled with the mold portions so as to reciprocate the first and second mold portions in a linear direction together to a closed condition in which the first and second mold portions bear against one another and apart to a spaced condition in closing and opening movements in the linear direction, the process comprising the steps of:
   reciprocating the first and second mold portions together and apart in closing and opening movements, respectively, in the linear direction with the first drive system; and
   at least temporarily displacing at least part of the mold in a second movement in the linear direction during at least part of one of the opening and closing movements with a second drive system also coupled with the mold, the second movement being separate and different from the one movement and being superimposed upon the one movement being performed by the first drive system, the one movement and the second movement combining so as to move the first and second mold portions asymmetrically with respect to a stationary reference plane oriented perpendicularly to the linear direction at least during the part of the one movement.

2. The process as set forth in claim 1 further comprising the preliminary step of presetting at least one of a separate travel-time characteristic and a speed characteristic for each of the first and second mold portions, the characteristics defining a reference position and speed over time, respectively, for each mold portion with respect to the stationary reference plane during at least the asymmetric movement of the reciprocating step, the preset characteristics defining non-symmetric positioning or movement of the first and second mold portions with respect to the stationary plane during at least some of the asymmetric movement, and wherein the reciprocating step further comprises the step of controlling the first drive system with at least one of a distance-time characteristic and a speed characteristic of the first and second mold portions defining spacing and speed over time, respectively, of the first and second mold portions relative to one another and derived from the preset characteristics of the first and second mold portions.

3. The process as set forth in claim 2 wherein the displacing step comprises the step of controlling the second drive system with at least one characteristic selected from the group consisting of the separate preset travel-time and speed characteristics defining position and speed, respectively, for each of the first and second mold portions, a distance-time characteristic and a speed characteristic, the latter two characteristics defining a reference position and speed over time, respectively, of a central plane with respect to the stationary reference plane, the central plane being located at all times midway between the first and second mold portions and parallel to the stationary reference plane, and each of the latter two characteristics being derived from the preset characteristics.

4. The process as set forth in claim 1 further comprising the preliminary step of presetting at least one of a separate travel-time characteristic and speed characteristic for each of the first and second mold portions, the characteristics defining a reference position and speed over time, respectively, for each mold portion with respect to the stationary reference plane during at least the asymmetric movement of the reciprocating step, the preset characteristics defining a non-symmetric positioning or speed of the first and second mold portions with respect to the stationary plane during at least some of the asymmetric movement; and wherein the displacing step comprises controlling the second drive system with one characteristic selected from the group consisting of the separate, preset travel-time and speed characteristics defining a reference position and speed over time, respectively of each of the first and second mold portions with respect to the stationary reference plane, a distance-time characteristic and a speed characteristic, the latter two characteristics defining a reference position and speed over time, respectively, of a central plane with respect to the stationary reference plane, the central plane being located at all times midway between the first and second mold portions and parallel to the stationary reference plane, and each of the latter two characteristics being derived from the preset characteristics.

5. The process as set forth in claim 4 in which the second drive system is coupled between one of the first and second mold portions and a stationary portion of the apparatus and wherein the displacing step comprises controlling the second drive system with the time-travel or speed characteristic preset for the one mold portion.

6. The process as set forth in claim 2 wherein the preliminary step comprises presetting a separate and different travel-time characteristic or speed characteristic for each mold portion for each of the opening and closing movements of the reciprocating step.

7. The process as set forth in claim 4 wherein the preliminary step comprises presetting a separate and different travel-time characteristic or speed characteristic for each mold portion for each of the opening and closing movements of the reciprocating step.

8. The process as set forth in claim 2 wherein the preliminary step further comprises presetting the one of the separate travel-time characteristic and the speed characteristic for each of the first and second mold portions for at least an ending of the closing movement of the reciprocating step to form a welded seam on a preform between the closing mold portions, to squeeze off waste material from the preform, or both.

9. The process as set forth in claim 8 wherein at least during the ending of the closing movement the first and second mold portions close symmetrically to a stop with respect to a member of the apparatus centered at the stationary reference plane, the member cooperating with the mold and being stationary at least in the linear direction.

10. The process as set forth in claim 9 wherein the second drive system remains inactive during the ending of the closing movement while the first and second mold portions close symmetrically to a stop.

11. The process as set forth in claim 1 wherein the apparatus further comprises a synchronization assembly coupling at least the first and second mold portions together and the second drive system with the mold, the synchronization assembly including at least one connecting element adjustable in effective length or in position in the linear direction, and wherein the displacing step comprises adjusting at least one of the effective length and the position in the linear direction of the one connecting element with the second drive system to provide the asymmetric movement of the first and second mold portions with respect to the stationary reference plane.

12. The process as set forth in claim 11 wherein the first drive system comprises a separate hydraulic drive for each of the first and second mold portions and a common source of hydraulic operating fluid for the separate hydraulic drives, wherein the process further comprises the preliminary step of presetting a distance-time characteristic defining a reference spacing of the first and second mold portions relative to one another over at least the asymmetric movement and wherein the reciprocating step further comprises the steps of controlling a total amount of hydraulic operating fluid supplied collectively to the separate hydraulic drives per unit time in accordance with the distance-time characteristic, at least during the asymmetric movement; and distributing the total amount of hydraulic operating fluid supplied to the separate hydraulic drives by varying the effective length or position of at least the one connecting element.

13. The process as set forth in claim 11 wherein the displacing step comprises at least during the asymmetric movement the steps of:
provinding a set of control values derived from at least one travel-time characteristic or speed characteristic for each one of the first and second mold portions, each characteristic defining a reference position or speed over time, respectively, of one mold portion with respect to the stationary reference plane;
detecting at least the one of the adjusted position and effective length of the one connecting element;
comparing the detected one of the adjusted position and length of the one connecting element with the provided control values; and
adjusting the one of the position and effective length of the one connecting element in response to the comparing step.

14. The process as set forth in claim 11 wherein the displacing step comprises adjusting the one of the position and the effective length of the one connecting element in accordance with values derived from one of a travel-time characteristic and a speed characteristic defining a reference position and speed over time, respectively, of a central plane with respect to the stationary reference plane, the central plane being located at all times midway between the first and second mold portions and parallel to the stationary reference plane.

15. The process as set forth in claim 14 further comprising the preliminary step of presetting at least one of a separate travel-time characteristic and a speed characteristic for each of the first and second mold portions, the characteristics defining a reference position and speed over time, respectively, for each of the first and second mold portions with respect to the stationary plane during at least the asymmetric movement, the preset characteristics defining a non-symmetric positioning or movement of the first and second mold portions with respect to the stationary plane during at least some of the asymmetric movement; and wherein the reciprocating step further comprises the step of controlling the first drive system with one of a distance-time characteristic and a speed characteristic of the first and second mold portions defining a reference spacing and speed over time, respectively, of the first and second mold portions relative to one another and derived from the preset characteristics of the first and second mold portions.

16. The process as set forth in claim 11 further comprising the step of locking the one of the position and effective length of the adjustable connecting element of the synchronization assembly following the displacing step.

17. The process as set forth in claim 1 further comprising the step of displacing the mold between a successive pair of the closing and opening movements in either order of the opening and closing movements.

18. The process of claim 1 wherein the displacing step occurs, at least in part, while relative spacing between the first and second mold portions does not change.

19. The process of claim 1 comprising the step of locating a preform at the stationary reference plane centrally positioned to be received in the mold in the closing movement.

20. The process as set forth in claim 2 wherein the displacing step comprises the step of controlling the second drive system with at least one characteristic selected from the group consisting of separate travel-time and speed characteristics for each of the first and second mold portions and a distance-time characteristic and a speed characteristic, the latter two characteristics defining a reference position and speed over time, respectively, of a central plane with respect to the stationary reference plane, the central plane being located at all times midway between the first and second mold portions and parallel to the stationary reference plane, and each of the latter two characteristics being derived from the preset characteristics.

21. A blow molding process employing an apparatus including a blow mold having at least first and second movable mold portions and a first drive system including separate hydraulic drives coupled with each of the mold portions so as to reciprocate the first and second mold portions in a linear direction together to a closed condition in which the first and second mold portions bear against one another and apart to a spaced condition in opening and closing movements in the linear direction, the process comprising the steps of:

presetting at least one of a separate time-travel characteristic and a speed characteristic for each of the first and second mold portions, the characteristics defining a reference position and speed over time, respectively, of each mold portion with respect to a stationary reference plane oriented perpendicularly to the linear direction, during at least part of at least one of the opening and closing movements, the preset characteristics defining non-symmetric positioning or movement of the first and second mold portions with respect to the stationary plane during at least some of the part of the one movement;

supplying a total amount of hydraulic operating fluid per unit time collectively to the separate hydraulic drives in accordance with a distance-time characteristic or a speed characteristic of the first and second mold portions defining a reference spacing and speed, respectively, of the first and second mold portions relative to one another and derived from the preset characteristics of the first and second mold portions during at least the part of the one movement; and selectively distributing the total amount of operating fluid being supplied to the separate hydraulic drives during at least the part of the one movement so as to drive the first and second mold portions in accordance with the separate travel-time characteristic or speed characteristic preset for each of the first and second mold portions with respect to the reference plane.

22. The process as set forth in claim 21 further comprising the steps of presetting the total amount of hydraulic operating fluid required for at least an entire one of the closing and opening movements; and transferring the preset total amount of hydraulic operating fluid to the separate hydraulic drives over the at least one movement by the supplying and distributing steps.

23. The process as set forth in claim 21 wherein the mold comprises a synchronization assembly coupling at least the first and second mold portions together, the synchronization assembly including at least one connecting element adjustable in at least effective length or in position in the linear direction and wherein the selectively distributing step comprises the steps of:

detecting actual variation in the one of the effective length and position of the one connecting element;

comparing the detected variation in the one connecting element with control values for displacement of the mold over time, the control values being derived from one of a distance-time characteristic and a speed characteristic defining a reference position and speed over time, respectively, of a central plane with respect to the stationary reference plane, the central plane being located at all times midway between the first and second mold portions and parallel to the stationary plane; and distributing the hydraulic operating fluid to the separate hydraulic drive in dependence upon any deviation between the actual variation of the adjustable connecting element and the control values.

* * * * *